United States Patent
White et al.

(10) Patent No.: US 11,481,750 B2
(45) Date of Patent: Oct. 25, 2022

(54) PAIRING A PAYMENT OBJECT READER WITH A POINT-OF-SALE TERMINAL

(71) Applicant: Block, Inc., San Francisco, CA (US)

(72) Inventors: Michael Wells White, San Francisco, CA (US); Afshin Rezayee, Ontar, CA (US); Bruce Bell, New York, NY (US); Malcolm Smith, Toronto (CA); Sergei Mosends, Ontario, CA (US); Andrew John Leiserson, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 635 days.

(21) Appl. No.: 14/855,130

(22) Filed: Sep. 15, 2015

(65) Prior Publication Data

US 2017/0004475 A1     Jan. 5, 2017

Related U.S. Application Data

(60) Provisional application No. 62/187,058, filed on Jun. 30, 2015.

(51) Int. Cl.
*G06Q 20/20* (2012.01)
*G07G 1/00* (2006.01)
(Continued)

(52) U.S. Cl.
CPC ......... *G06Q 20/204* (2013.01); *G06Q 20/202* (2013.01); *G06Q 20/322* (2013.01);
(Continued)

(58) Field of Classification Search
CPC ........... G06Q 20/3278; G06Q 20/3226; G06Q 20/341; G06Q 20/352; G06Q 20/356;
(Continued)

(56) References Cited

U.S. PATENT DOCUMENTS

| 3,128,349 A | 4/1964 | Boesch et al. |
|---|---|---|
| 4,405,829 A | 9/1983 | Rivest et al. |

(Continued)

FOREIGN PATENT DOCUMENTS

| AU | 2324402 A | 6/2002 |
|---|---|---|
| CA | 2 990 199 A1 | 1/2017 |

(Continued)

OTHER PUBLICATIONS

Notice of Allowance dated May 18, 2016, for U.S. Appl. No. 15/056,961, of Templeton, T., et al., filed Feb. 29, 2016.
(Continued)

*Primary Examiner* — Florian M Zeender
*Assistant Examiner* — Milena Racic
(74) *Attorney, Agent, or Firm* — Lee & Hayes, P.C.

(57) ABSTRACT

In some examples, a system and method for pairing a payment object reader with a point-of-sale (POS) terminal is described herein. The payment object reader includes one or more light indicators configured to display information in an optical pattern of one or more colors, brightness, lightness, and intensities, wherein the light indicators display a first optical pattern representative of an operational status of the payment object reader in a first mode, and a second optical pattern representative of a pairing code in a second mode. A display control component, executed by a processor, is configured to control the light indicators in accordance with the pairing code to generate the second optical pattern, the second optical pattern when shared with the POS terminal enables pairing between the payment object reader and the POS terminal. When paired, the payment object reader allows the POS terminal to accept payments from a customer.

21 Claims, 12 Drawing Sheets

(51) Int. Cl.
  *G07G 1/12* (2006.01)
  *G06Q 20/34* (2012.01)
  *G07G 1/01* (2006.01)
  *G06Q 20/32* (2012.01)

(52) U.S. Cl.
  CPC ....... *G06Q 20/3223* (2013.01); *G06Q 20/352* (2013.01); *G06Q 20/3567* (2013.01); *G07G 1/009* (2013.01); *G07G 1/0036* (2013.01); *G07G 1/01* (2013.01); *G07G 1/12* (2013.01)

(58) Field of Classification Search
  CPC .. G06K 7/084; G06K 7/0008; G06K 7/10148; G06K 7/14; G07F 7/0886; G07F 7/088; H04L 63/0853; G06F 21/36
  See application file for complete search history.

(56) References Cited

U.S. PATENT DOCUMENTS

| | | |
|---|---|---|
| 4,776,003 A | 10/1988 | Harris |
| 4,860,336 A | 8/1989 | D'Avello et al. |
| 5,221,838 A | 6/1993 | Gutman et al. |
| 5,241,161 A | 8/1993 | Zuta |
| 5,351,296 A | 9/1994 | Sullivan |
| 5,388,155 A | 2/1995 | Smith |
| 5,408,513 A | 4/1995 | Busch, Jr. et al. |
| 5,434,395 A | 7/1995 | Storck et al. |
| 5,714,741 A | 2/1998 | Pieterse et al. |
| 5,729,591 A | 3/1998 | Bailey |
| 5,740,232 A | 4/1998 | Pailles et al. |
| 5,789,733 A | 8/1998 | Jachimowicz et al. |
| 5,838,773 A | 11/1998 | Eisner et al. |
| 5,850,599 A | 12/1998 | Seiderman |
| 5,867,795 A | 2/1999 | Novis et al. |
| 5,940,510 A | 8/1999 | Curry et al. |
| 6,010,067 A | 1/2000 | Elbaum |
| 6,098,881 A | 8/2000 | Deland, Jr. et al. |
| 6,144,336 A | 11/2000 | Preston et al. |
| 6,234,389 B1 | 5/2001 | Valliani et al. |
| 6,278,779 B1 | 8/2001 | Bryant et al. |
| 6,327,578 B1 | 12/2001 | Linehan |
| 6,481,623 B1 | 11/2002 | Grant et al. |
| 6,886,742 B2 | 5/2005 | Stoutenburg et al. |
| 6,990,683 B2 | 1/2006 | Itabashi |
| 7,003,316 B1 | 2/2006 | Elias et al. |
| 7,040,534 B2 | 5/2006 | Turocy et al. |
| 7,065,645 B2 * | 6/2006 | Teicher .................... G07C 9/21 713/167 |
| 7,066,382 B2 | 6/2006 | Kaplan |
| 7,083,090 B2 | 8/2006 | Zuili |
| 7,124,953 B2 * | 10/2006 | Anttila .................... G06K 1/18 235/472.02 |
| 7,163,148 B2 | 1/2007 | Durbin et al. |
| 7,210,627 B2 | 5/2007 | Morley et al. |
| 7,424,732 B2 | 9/2008 | Matsumoto et al. |
| 7,433,452 B2 | 10/2008 | Taylor et al. |
| 7,591,425 B1 | 9/2009 | Zuili et al. |
| 7,673,799 B2 | 3/2010 | Hart et al. |
| 7,810,729 B2 | 10/2010 | Morley, Jr. |
| 7,865,430 B1 | 1/2011 | Kolls |
| 7,884,734 B2 * | 2/2011 | Izadi .................... H04W 76/14 340/686.6 |
| 7,896,248 B2 | 3/2011 | Morley, Jr. |
| 8,086,531 B2 | 12/2011 | Litster et al. |
| 8,126,734 B2 | 2/2012 | Dicks et al. |
| 8,128,002 B2 | 3/2012 | McCallum et al. |
| 8,265,553 B2 | 9/2012 | Cheon et al. |
| 8,397,988 B1 | 3/2013 | Zuili |
| 8,768,838 B1 | 7/2014 | Hoffman |
| 8,983,873 B2 | 3/2015 | Lund |
| 9,020,853 B2 | 4/2015 | Hoffman et al. |
| 9,022,285 B2 | 5/2015 | Graylin |
| 9,022,291 B1 | 5/2015 | van der Merwe et al. |
| 9,022,292 B1 | 5/2015 | van der Merwe et al. |
| 9,047,599 B1 | 6/2015 | Lambert et al. |
| 9,128,703 B1 | 9/2015 | Lachwani et al. |
| 9,173,098 B1 | 10/2015 | Ran et al. |
| 9,286,500 B1 | 3/2016 | Post et al. |
| 9,312,949 B1 | 4/2016 | Templeton et al. |
| 9,443,118 B1 | 9/2016 | Templeton et al. |
| 9,489,670 B2 | 11/2016 | McGill |
| 9,530,032 B2 | 12/2016 | Post et al. |
| 9,633,350 B2 | 4/2017 | Post et al. |
| 9,679,286 B2 | 6/2017 | Colnot et al. |
| 9,715,585 B2 * | 7/2017 | Seema .................... G06F 21/36 |
| 9,911,118 B2 | 3/2018 | Carlson |
| 10,068,550 B1 | 9/2018 | Chen |
| 10,120,427 B1 | 11/2018 | Hebner et al. |
| 2001/0015377 A1 | 8/2001 | Vassura et al. |
| 2001/0021980 A1 | 9/2001 | Linden et al. |
| 2002/0091633 A1 | 7/2002 | Proctor |
| 2002/0153414 A1 | 10/2002 | Stoutenburg et al. |
| 2003/0135418 A1 | 7/2003 | Shekhar et al. |
| 2003/0154414 A1 | 8/2003 | von Mueller et al. |
| 2003/0183691 A1 | 10/2003 | Lahteenmaki et al. |
| 2004/0012875 A1 | 1/2004 | Wood |
| 2004/0041911 A1 | 3/2004 | Odagiri et al. |
| 2004/0059682 A1 | 3/2004 | Hasumi et al. |
| 2004/0099746 A1 | 5/2004 | Norton |
| 2004/0167820 A1 | 8/2004 | Melick et al. |
| 2004/0204082 A1 | 10/2004 | Abeyta |
| 2005/0097015 A1 | 5/2005 | Wilkes et al. |
| 2005/0109841 A1 | 5/2005 | Ryan et al. |
| 2005/0236480 A1 | 10/2005 | Vrotsos et al. |
| 2005/0243059 A1 | 11/2005 | Morris et al. |
| 2005/0247787 A1 | 11/2005 | Von Mueller et al. |
| 2006/0032905 A1 | 2/2006 | Bear et al. |
| 2006/0049255 A1 | 3/2006 | von Mueller et al. |
| 2006/0135204 A1 * | 6/2006 | Angelhag .......... H04M 1/6091 455/557 |
| 2006/0219776 A1 | 10/2006 | Finn |
| 2006/0223580 A1 | 10/2006 | Antonio et al. |
| 2007/0022058 A1 | 1/2007 | Labrou et al. |
| 2007/0067833 A1 | 3/2007 | Colnot |
| 2007/0070035 A1 | 3/2007 | Asbury et al. |
| 2007/0168300 A1 | 7/2007 | Quesselaire et al. |
| 2007/0194104 A1 | 8/2007 | Fukuda et al. |
| 2007/0198436 A1 | 8/2007 | Weiss |
| 2007/0251997 A1 | 11/2007 | Brown et al. |
| 2008/0014984 A1 | 1/2008 | Brown et al. |
| 2008/0017704 A1 | 1/2008 | VanDeburg et al. |
| 2008/0091617 A1 | 4/2008 | Hazel et al. |
| 2008/0113618 A1 * | 5/2008 | De Leon ............ H04M 1/7253 455/41.2 |
| 2009/0033513 A1 | 2/2009 | Salsbury et al. |
| 2009/0067846 A1 * | 3/2009 | Yu ...................... H04B 10/1143 398/128 |
| 2009/0070583 A1 | 3/2009 | von Mueller et al. |
| 2009/0112768 A1 | 4/2009 | Hammad et al. |
| 2009/0164326 A1 | 6/2009 | Bishop et al. |
| 2009/0188977 A1 | 7/2009 | Adams et al. |
| 2009/0195402 A1 | 8/2009 | Izadi et al. |
| 2009/0282261 A1 | 11/2009 | Khan et al. |
| 2010/0012715 A1 | 1/2010 | Williams et al. |
| 2010/0057620 A1 | 3/2010 | Li et al. |
| 2010/0087144 A1 | 4/2010 | Korenshtein |
| 2010/0138666 A1 | 6/2010 | Adams et al. |
| 2010/0235621 A1 | 9/2010 | Winkler et al. |
| 2010/0243732 A1 | 9/2010 | Wallner |
| 2010/0257101 A1 | 10/2010 | Fierro |
| 2010/0304819 A1 * | 12/2010 | Stockdale ............ G06Q 20/327 463/16 |
| 2011/0070634 A1 | 3/2011 | Takahashi et al. |
| 2011/0070834 A1 | 3/2011 | Griffin et al. |
| 2011/0159959 A1 | 6/2011 | Mallinson et al. |
| 2011/0210848 A1 | 9/2011 | Howard et al. |
| 2012/0126011 A1 | 5/2012 | Lamba et al. |
| 2012/0254622 A1 | 10/2012 | Kanungo |
| 2012/0324501 A1 | 12/2012 | Klein et al. |
| 2013/0030931 A1 | 1/2013 | Moshfeghi |
| 2013/0084801 A1 | 4/2013 | Royston et al. |
| 2013/0096701 A1 | 4/2013 | Suorajaervi et al. |
| 2013/0124346 A1 | 5/2013 | Baldwin et al. |

(56) References Cited

U.S. PATENT DOCUMENTS

| | | |
|---|---|---|
| 2013/0182845 A1 | 7/2013 | Monica et al. |
| 2013/0198516 A1 | 8/2013 | Fenton et al. |
| 2013/0328801 A1 | 12/2013 | Quigley et al. |
| 2014/0001263 A1* | 1/2014 | Babu .................. G06F 1/3215 235/440 |
| 2014/0001264 A1 | 1/2014 | Babu et al. |
| 2014/0016945 A1 | 1/2014 | Pan |
| 2014/0019304 A1 | 1/2014 | Lee et al. |
| 2014/0025517 A1 | 1/2014 | Argue et al. |
| 2014/0029913 A1 | 1/2014 | Lopez et al. |
| 2014/0122884 A1 | 5/2014 | Pieczul et al. |
| 2014/0267934 A1 | 9/2014 | Hardin |
| 2014/0316560 A1 | 10/2014 | Hoormann et al. |
| 2014/0325220 A1 | 10/2014 | Tunnell et al. |
| 2014/0372320 A1* | 12/2014 | Goldfarb ............... G07F 7/1033 705/72 |
| 2015/0133047 A1 | 5/2015 | Smith et al. |
| 2015/0234525 A1* | 8/2015 | Yisraelian ........... G06F 3/04883 345/174 |
| 2015/0278506 A1 | 10/2015 | Jun et al. |
| 2015/0287030 A1 | 10/2015 | Sagady et al. |
| 2015/0334351 A1 | 11/2015 | Cocchi et al. |
| 2015/0347738 A1 | 12/2015 | Ulrich et al. |
| 2015/0348009 A1 | 12/2015 | Brown et al. |
| 2016/0007290 A1 | 1/2016 | Lindemann et al. |
| 2016/0019512 A1 | 1/2016 | Buchheim et al. |
| 2016/0088711 A1 | 3/2016 | Ng et al. |
| 2016/0098711 A1 | 4/2016 | Patel et al. |
| 2016/0112825 A1 | 4/2016 | Miller |
| 2016/0134709 A1 | 5/2016 | Savolainen |
| 2016/0198210 A1 | 7/2016 | Torikai et al. |
| 2016/0275478 A1 | 9/2016 | Li et al. |
| 2016/0307189 A1 | 10/2016 | Zarakas et al. |
| 2017/0091732 A1 | 3/2017 | Rezayee et al. |
| 2017/0091762 A1 | 3/2017 | Rezayee et al. |
| 2017/0109743 A1 | 4/2017 | Zarakas et al. |
| 2017/0164214 A1 | 6/2017 | Hara |
| 2017/0325161 A1 | 11/2017 | Kwon et al. |
| 2019/0385149 A1* | 12/2019 | Wurmfeld ........... G06Q 20/3563 |

FOREIGN PATENT DOCUMENTS

| | | |
|---|---|---|
| CA | 2990199 C | 6/2021 |
| DE | 20320080 U1 | 4/2004 |
| EP | 0 895 203 A2 | 2/1999 |
| EP | 1 874 014 A2 | 1/2008 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2017/004070 A1 | 1/2017 |
| WO | 2017/053736 A1 | 3/2017 |

OTHER PUBLICATIONS

International Search Report and Written Opinion for International Patent Application No. PCT/US2016/039872, dated Nov. 29, 2016.

Zoltan, M.B., "How Do I Pair My Phone to a Bluetooth Device?," TechHive, Published on Nov. 1, 2010, Retrieved from the internet URL : http://www.techhive.com/article/209431/pair_phone_with_bluetooth_device.html, on Nov. 10, 2014, pp. 1-3.

Restriction Requirement dated Aug. 5, 2015, for U.S. Appl. No. 13/786,373, of Templeton, T., et al., filed Mar. 5, 2013.

Non-Final Office Action dated Nov. 5, 2015, for U.S. Appl. No. 13/786,373, of Templeton, T., et al., filed Mar. 5, 2013.

Notice of Allowance dated Dec. 22, 2015, for U.S. Appl. No. 13/786,373, of Templeton, T., et al., filed Mar. 5, 2013.

Tobias H. "Flashlight: Optical Communication between Mobile Phones and Interactive Tabletops," Saarbrucken, Germany,ITS 2010: Interactions, Nov. 7-10, 2010, pp. 135-138.

Non-Final Office Action dated Oct. 2, 2014, for U.S. Appl. No. 13/841,689, of Post, D.J., et al., filed Mar. 15, 2013.

Non-Final Office Action dated Apr. 20, 2015, for U.S. Appl. No. 13/841,689, of Post, D.J., et al., filed Mar. 15, 2013.

Final Office Action dated Oct. 1, 2015, for U.S. Appl. No. 13/841,689, of Post, D.J., et al., filed Mar. 15, 2013.

Notice of Allowance dated Nov. 6, 2015, for U.S. Appl. No. 13/841,689, of Post, D.J., et al., filed Mar. 15, 2013.

Notice of Allowance dated Feb. 12, 2016, for U.S. Appl. No. 13/841,689, of Post, D.J., et al., filed Mar. 15, 2013.

Non-Final Office Action dated Apr. 21, 2016, for U.S. Appl. No. 14/966,985, of Post, D.J., et al., filed Dec. 11, 2015.

Non-Final Office Action dated Jun. 16, 2016, for U.S. Appl. No. 14/864,423, of Rezayee, A., et al., filed Sep. 24, 2015.

Non-Final Office Action dated Jun. 27, 2016, for U.S. Appl. No. 14/709,394, of Chen, G.H., filed May 11, 2015.

Notice of Allowance dated Aug. 15, 2016, for U.S. Appl. No. 14/966,985, of Post, D.J., et al., filed Dec. 11, 2015.

Notice of Allowance dated Nov. 17, 2016, for U.S. Appl. No. 14/966,985, of Post, D.J., et al., filed Dec. 11, 2015.

Final Office Action dated Nov. 25, 2016, for U.S. Appl. No. 14/864,423, of Rezayee, A., et al., filed Sep. 24, 2015.

Notice of Allowance dated Dec. 29, 2016, for U.S. Appl. No. 14/709,394, of Chen, G.H., filed May 11, 2015.

Notice of Allowance dated Jan. 9, 2017, for U.S. Appl. No. 15/355,709 , of Post, D. J., et al., filed Nov. 18, 2016.

Non-Final Office Action dated Jul. 26, 2017, for U.S. Appl. No. 14/864,423, of Rezayee, A., et al., filed Sep. 24, 2015.

Non-Final Office Action dated Jan. 12, 2018, for U.S. Appl. No. 15/086,002, of Hebner, N., et al., filed Mar. 30, 2016.

Notice of Allowance dated May 1, 2018, for U.S. Appl. No. 15/471,062, of Chen, G.H., filed Mar. 28, 2017.

Notice of Allowance dated Jul. 3, 2018, for U.S. Appl. No. 15/086,002, of Hebner, N., et al., filed Mar. 30, 2016.

(56) References Cited

OTHER PUBLICATIONS

Examiner Requisition for Canadian Patent Application No. 2,990,199, dated Sep. 17, 2018.
International Search Report and Written Opinion for International Application No. PCT/US2016/053354, dated Nov. 16, 2016.
Supplementary European Search Report for European Patent Application No. 16818610.4, dated Oct. 26, 2018.
Du, W., "A mobile Signing Solution Based on Personal Transaction Protocol and J2ME," Diss. University of Ottawa (Canada), pp. 1-111 (2006).
Final Office Action dated Feb. 20, 2019, for U.S. Appl. No. 14/864,423, of Rezayee, A. et al., filed Sep. 24, 2015.
Non-Final Office Action dated Apr. 19, 2019, for U.S. Appl. No. 14/864,547, of Rezayee, A. et al., filed Sep. 24, 2015.
Decision to Grant for European Patent Application No. 16775952.1, dated Apr. 26, 2019.
Non-Final Office Action dated May 2, 2019, for U.S. Appl. No. 15/199,388, of Han, K. et al., filed 30, 2016.
Final Office Action dated Nov. 21, 2019, for U.S. Appl. No. 15/199,388, of Han, K., et al., filed Jun. 30, 2016.
Advisory Action dated Jan. 17, 2020, for U.S. Appl. No. 14/864,547, of Rezayee, A., et al., filed Sep. 24, 2015.
Advisory Action dated Feb. 6, 2020, for U.S. Appl. No. 15/199,388, of Han, K., et al., filed Jun. 30, 2016.
Examination Report for European Patent Application No. 16818610.4, dated Nov. 26, 2019.
Adam C., Master Key. In: Encyclopedia of Cryptography and Security, Tilborg V., et al., eds., Springer, Boston, 2011, p. 762.
Examiner Requisition for Canadian Patent Application No. 2,990,199, dated Aug. 8, 2019.
Non-Final Office Action dated Oct. 10, 2019, for U.S. Appl. No. 14/864,423, of Rezayee, A. et al., filed Sep. 24, 2015.
Final Office Action dated Oct. 17, 2019, for U.S. Appl. No. 14/864,547, of Rezayee, A., et al., filed Sep. 24, 2015.
Non-Final Office Action dated Apr. 13, 2020, for U.S. Appl. No. 14/864,423 of Rezayee, A., et al., filed Sep. 24, 2015.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"Embedded FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing-rev1.pdf Apr. 14, 2008.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
Non-Final Office Action dated May 15, 2020, for U.S. Appl. No. 15/199,388, of Han, K., et al., filed Jun. 30, 2016.
Supplemental Notice of Allowability dated Jan. 15, 2021, for U.S. Appl. No. 14/864,423 of Rezayee, A., et al., filed Sep. 24, 2015.
Supplemental Notice of Allowability dated Nov. 5, 2020, U.S. Appl. No. 14/864,423 of Rezayee, A., et al., filed Sep. 24, 2015.
Non-Final Office Action dated Oct. 21, 2020, for U.S. Appl. No. 14/864,547, of Rezayee, A., et al., filed Sep. 24, 2015.
Notice of Allowance dated Oct. 22, 2020, for U.S. Appl. No. 14/864,423 of Rezayee, A., et al., filed Sep. 24, 2015.
Summons to attend oral proceedings for European Patent Application No. 16818610.4, mailed May 24, 2021.
Final Office Action dated Apr. 12, 2021, for U.S. Appl. No. 14/864,547, of Rezayee, A., et al., filed Sep. 24, 2015.
Notice of Allowance dated Apr. 14, 2021, U.S. Appl. No. 14/864,423 of Rezayee, A., et al., filed Sep. 24, 2015.
Liu, Chin-Jung, "Improving Spectrum Efficiency in Heterogenous Wireless Networks", 2018, Michigan State University, ProQuest Dissertations Publications, pp. 1-13.
Final Office Action dated Sep. 30, 2021, for U.S. Appl. No. 15/199,388, of Han, K., et al., filed Jun. 30, 2016.
Non-Final Office Action dated Nov. 29, 2021, for U.S. Appl. No. 14/864,547, of Rezayee, A., et al., filed Sep. 24, 2015.
Advisory Action dated Dec. 3, 2021, for U.S. Appl. No. 15/199,388, of Han, K., et al., filed Jun. 30, 2016.
Non-Final Office Action dated Feb. 2, 2021, for U.S. Appl. No. 15/199,388, of Han, K., et al., filed Jun. 30, 2016.
Silva., A. R "Theory and Design of Magnetic Induction-Based Wireless Underground Sensor Networks", The Academic Faculty, ProQuest Dissertations Publishing, 304 pages.
Non-Final Office Action dated Feb. 11, 2022, for U.S. Appl. No. 15/199,388, of Han, K., et al., filed Jun. 30, 2016.
Examiner Requisition for Canadian Patent Application No. 3115340, dated May 16, 2022.
Final Office Action dated Jun. 22, 2022, for U.S. Appl. No. 14/864,547, of Rezayee, A., et al., filed Sep. 24, 2015.

* cited by examiner

PAIRING A PAYMENT OBJECT READER WITH A POINT-OF-SALE TERMINAL

CROSS REFERENCE TO RELATED APPLICATIONS

This application claims priority to U.S. Provisional Patent Application No. 62/187,058, filed Jun. 30, 2015, titled "Pairing a payment object reader with a point-of-sale terminal," the entire contents of which are incorporated herein by reference.

TECHNICAL FIELD

Generally, a merchant uses a point-of-sale terminal to process a transaction. The terminal is connected, usually with wires, to a cash register and to an Internet connection. Some terminals process chip cards; for such terminals, a card is inserted into the terminal and the user enters a Personal Identification Number (PIN) on a keypad of the terminal. Other terminals process magnetic stripe cards. For such terminals, the card is swiped through a slot. Mobile card readers are also available for magnetic stripe cards.

Some mobile card readers, e.g., in taxies, use cellular technology to communicate wirelessly with the credit card processor. Some mobile card readers use wireless technology, e.g., Bluetooth®, to communicate with the credit card processor. Bluetooth uses a process called pairing to allow devices to communicate with each other. Pairing mechanisms include legacy pairing and Secure Simple Pairing (SSP). SSP includes a number of association models for pairing, namely, "just works", "numeric comparison", "passkey entry", and "out of band (OOB)," specifically designed to counter a "Man-In-The-Middle Attack" (MITM) exploit. MITM is an attack by a rogue device, which attempts to insinuate itself into the legitimate Bluetooth "trust dialogue" during pairing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1:
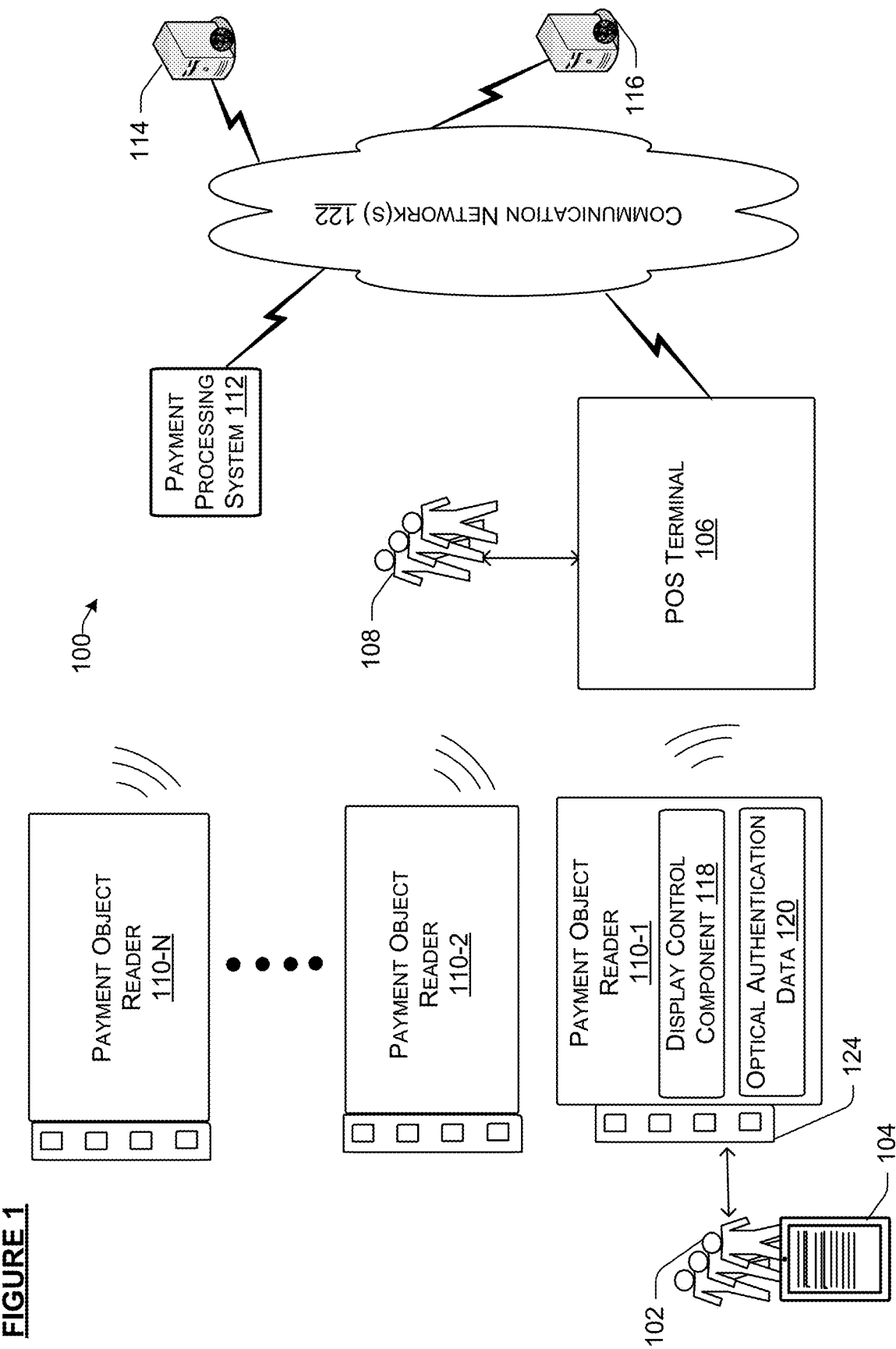
FIG. 1 is a block diagram illustrating an exemplary environment for establishing a communication channel between a computing device, e.g., a point-of-sale (POS) terminal, and a payment object reader to facilitate processing of contact and/or contact-less payment transactions, according to an embodiment of the present subject matter.

Embodiments for pairing a payment object reader with a point-of-sale (POS) terminal ("pairing technology") are described herein. POS terminal is a device, which is usually a combination of software and hardware that allows merchant locations to accept payments for a product or a service; processes the payment transaction for which the payment is made, e.g., by connecting to banks; and facilitates transfer of funds from the banks to furnish the payment transaction. The POS terminal is generally connected to a payment object reader, which can read different kinds of payment objects.

The payment object reader initiates a payment transaction by receiving payment through a payment object. The payment object can be any payment mechanism, for example, a debit card, a credit card, a smart-card conforming to a Europay-MasterCard-Visa ("EMV") standard, a radio frequency identification tag (i.e., near field communication enabled objects), or a virtual payment card stored on a device such as a smart phone and transmittable, for example, via near field communication (NFC). Once connected or paired with the POS terminal, the payment object reader can transmit the data read off the payment object to the POS terminal, which then processes the data to complete a payment transaction for a product or service. The POS terminal can be a mobile device or a desktop device. Mobile devices include smart phones, tablet computers, laptops, or other mobile data processing apparatus. The POS terminal and the payment object reader can be wireless devices, which in the absence of a wired connection have to be paired before sharing information between the two devices.

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired."

Briefly described, a POS terminal connects with an intended payment object reader by requesting the intended payment object reader to share a password (hereinafter referred to as authentication data, pairing parameter(s), or pairing code interchangeably) with the other. The POS terminal through a sensor device may capture the shared authentication data as visible to it. Alternatively, a merchant through a user interface of the POS terminal enters the shared authentication data as visible to him and sends the entered information to the payment object reader for confirmation. The payment object reader compares the entered or sensed data with the actual authentication data, and based on the comparison, facilitates pairing or a communication channel to be established with the POS terminal. The channel can be further secured by sharing private security tokens between the payment object reader and the POS terminal through the established communication channel, or alternatively, through a separate channel.

Generally, a traditional payment object reader presents the password to the merchant on a display, e.g., using a graphical user interface or display screen. But, as contemplated in the present subject matter, some payment object readers may not have the conventional means to display alphanumeric information. As such, in one implementation, the payment object reader can transmit alphanumeric authentication data by displaying such data in the form of colors, luminance, intensity, lightness, chroma, and brightness through visual indicators, such as light emitting diodes (LEDs).

The colors of LEDs, particularly in the context of payment object readers designed to read EMV smart-cards, are generally provisioned as per EMV specifications to indicate operational status of the payment object reader or a state of payment transaction. For example, a green LED can indicate successful transaction, while a red LED can indicate a failed transaction, and a yellow LED can indicate processing of the payment transaction. As discussed in detail herein, such EMV-provisioned LEDs can be repurposed to also optically transmit authentication data in various colors, brightness, intensities, etc. These LEDs can be particularly useful in implementations where the payment object reader does not include a display or in cases where the payment object reader cannot receive or send audio, video or haptic data. Through the repurposed LEDs, the payment object reader can visually transmit information, such as data for pairing two wireless devices.

Briefly described, payment object readers that implement the present techniques include a display control component to convert pairing parameters, such as alphanumeric authentication data for pairing, into "optical authentication data" or "optical pattern," which can be a color code formed by a specific color arrangement or color combination of LEDs. A display control component generates the color code, which is unique to the payment object reader or the POS terminal requesting pairing. Furthermore, the display control component can modify the colors, intensities, brightness, lightness, or luminance of light emitted by the LEDs to provide even more unique possibilities in the way the optical authentication data is displayed through the LEDs. In this manner, the display control component drives the LEDs to either deliver transaction/operational status according to an EMV standard, or to deliver authentication data during a pairing operation. The pairing component can also create and implement rules defining the relationship between the authentication data and an optical authorization data displayed through the arrangement of LEDs and/or sequence of colors emitted by the LEDs. The pairing component may store the rules either locally within the payment object reader or on an external server, such as a payment processing system that can connect with an issuer or acquirer, e.g., a bank, associated with the payment object.

To start the process of pairing the POS terminal with the payment object reader, the POS terminal, through a pairing component, discovers and identifies a desired payment object reader from a list of devices available in its network. When selected, the desired payment object reader emits through the LEDs, a visual pattern of colors indicative or representative of the authentication data. A user of the POS terminal can inspect the visual pattern and manually enter the as-inspected pattern on a display screen of the POS terminal. The POS terminal can also capture an image of the visual pattern through a camera or any such sensor device. A POS pairing component of the POS terminal sends the inspected or captured data to a pairing component of the desired payment object reader, which compares the incoming data with the visual pattern. If there is a match, the payment object reader establishes a communication channel to connect the POS terminal with the payment object reader, the channel allows the merchant operating the POS terminal to accept any payment object from the customer and transfer data read off the payment object by the payment object reader to the payment processing system. The payment processing system receives the payment object data and causes funds to be transferred from a financial account of the customer to a financial account of the merchant. Thus, as described above, by taking existing hardware and software used for displaying the status of a financial transaction, and repurposing it to be used for pairing purposes, display-less payment object readers can be paired with any POS terminal.

In contrast to the disclosed pairing technology, traditional methods need to display the authentication data on a display screen of the payment object reader, and the merchant operating the POS terminal must physically enter authentication data displayed by the desired reader into a graphical user interface of the POS terminal via keypad. The authentication data however is generally a complex string of characters. While indicative of the desired reader, the authentication data is not easily distinguishable, making it difficult for the merchant to quickly and easily identify a specific reader and/or connect to the desired reader without much trial-and-error. It is also desirable to connect to the correct reader and avoid risks associated with sharing secure information with an undesired reader. Furthermore, some payment object readers may not even have an interface or display for output or a keyboard for numeric input or an alternative communications medium to facilitate trust exchange.

To this end, the pairing technology described herein alleviates at least the problems identified above by converting the complex authentication data into optical data or a visual pattern that is relatively easy for the merchant to distinguish. Furthermore, by using existing LEDs to display the visual pattern, the disclosed systems remove the need for additional hardware features.

The pairing technology may find various applications in, e.g., contact and contactless POS systems and scenarios. In one example scenario, the pairing technology may be used in applications where multiple payment object readers are being handled by employees of a merchant. The merchant or an owner of a store can provide managerial assistance by pairing with any reader through the pairing techniques described herein. The merchant can also monitor the activity on a specific reader with which it is paired. In another scenario, the merchant can provide support to a reader experiencing heavy traffic, e.g., by monitoring the activity on a paired reader and routing orders for items and services via merchant's terminal from the paired reader to another paired payment object reader, which is less crowded than the current paired payment object reader.

The pairing technology can also be configured to operate irrespective of the kind of payment object reader, POS terminal, web applications, mobile applications, POS topologies, payment cards, computer networks, and environments. The pairing technology described herein can pair a payment object reader to the POS terminal in both real-time and offline modes. Furthermore, even though Bluetooth or Bluetooth Low Energy has been used to describe certain embodiments, other wireless protocols, such as NFC, Wi-Fi, etc., can also be used.

The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "component" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

Additionally, as used herein, the term "payment card," "payment object," or "payment instrument" refers to a payment mechanism that includes a debit card, a credit card, a prepaid gift card, or the like, a smartcard that has an embedded integrated circuit chip (e.g., Europay-MasterCard-Visa (EMV) card), a proxy card, or any card that functions as a combination of any of these mechanisms. The term "proxy object" as used herein refers to a card that may or may not bear a card number/account number that appears to be that of a real credit or debit card account (i.e., it is in the correct format), but where that card/account number is actually only a proxy for the customer's real card/account number. Another type of payment object is a biometrically identifiable instrument, which may be initialized using a person's finger (e.g., for fingerprint recognition), face, iris or retina, heartbeat, etc. Alternatively, the payment object can be a software instrument or virtual instrument, such as a virtual wallet configured to initiate contactless payment transactions, e.g., a key fob, a mobile device having an RFID tag, etc. Other examples of payment object may also include a prepaid card, a gift card, a rewards card, a loyalty points card, a frequent flyer miles card, checks, cash, or in general, any kind of financial instrument that holds financial value or provides a promise to pay at a later time. Thus, a payment object transaction (also referred to as payment card transaction) may be any be a transaction where a merchant or a user swipes the user's credit card through a payment object reader in exchange for a product or service offered by the merchant.

The term "swipe" here refers to any manner of triggering a payment object reader to read data from a payment object, such as by dipping into, tapping, hovering, bringing in close contact or passing the payment object into or through a payment object reader.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The pairing technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

Turning now to the Figures, FIG. 1 illustrates an exemplary environment 100 for establishing a communication channel between a computing device, e.g., POS terminal 106, and a payment object reader 110 to facilitate processing of contact and/or contact-less payment transactions, according to an embodiment of the present subject matter. A payment transaction can include reading payment data off payment objects 104, for example, credit cards, debit cards, gift cards, drivers license cards, identification cards, or in general, any object with financial information stored thereon or connected to financial information stored on an external server.

A customer(s) 102 provides the payment object 104 to pay for a product or service offered by a merchant 108. The merchant 108 introduces (swipes, taps, dips, inserts, or otherwise brings in proximity) the payment object 104 in any one of the payment object readers 110-1, 110-2, . . . , 110-N (collectively referred to as payment object reader(s) 110), which are or can be wirelessly connected to a POS terminal 106 to process the transactions for which the payment object is introduced.

The POS terminal 106 can be a mobile device or a desktop device. Mobile devices include smart phones, tablet computers, laptops, or other mobile data processing apparatus. In one implementation, the POS terminal 106 can be a POS terminal operated and managed by a merchant(s) 108.

The payment object reader 110 can process payment objects 104 having magnetic stripe cards or smart chip cards. Smart chip cards can be processed according to the Europay, MasterCard, Visa (EMV) protocol. In some implementations, the payment object reader 110 processes cards using Near Field Communication (NFC) hardware and the NFC protocol. Thus, the payment object reader 110 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain payment transaction data off a payment object 104.

The payment object reader 110 implements one or more mechanisms to capture data from and off the payment objects 104 and to communicate the captured data (hereinafter referred to as "payment object read-data" or "read-data") wirelessly to the POS terminal 106. For example, the payment object reader 110 may include hardware features, such as slots, magnetic tracks, and rails with one or more sensors or electrical contacts to facilitate detection and acceptance of a payment object 104. In some cases, to allow exchange of data, such as read-data, the POS terminal 106 connects to a specific payment object reader, e.g., payment object reader 110-1 from amongst a plurality of payment object readers 110, over wireless local area network or shorter range wireless communication network, and can occur in many forms, for example, Bluetooth, Bluetooth Low Energy, Wi-Fi, NFC, etc. To allow this, both the POS terminal 106 and the payment object reader 110 include transceivers and antenna (not shown in this figure). Once connected, the payment object reader 110 can then broadcast data to the POS terminal 106 and vice-versa through the established channel. In some implementations, the payment object reader 110 and the POS terminal 106 undergo a pairing process before establishing communication to verify a source and destination for data transfer, as described below.

Bluetooth pairing can be done by "device association," "device identification," or "device pairing" of between Bluetooth enabled devices (e.g., the POS terminal 106 and payment object reader 110 having Bluetooth communication capabilities), over short distances via radio wave transmission. Devices can be associated, i.e., identified, connected and paired together by first exchanging a public password (hereinafter referred to as pair communication data or authentication data) wirelessly, to enable the subject wireless devices to trust each other, prior to establishing secure and interactive sessions conducted via open Bluetooth wireless radio communications. The authentication data may be authentication code, PIN code, "Bluetooth Device Address", "Simple Pairing Hash C" or "Simple Pairing Randomizer R," for example. As shown in the figure, radio signals indicate devices enabled to communicate with other devices via Bluetooth or BLE.

In one implementation, to pair the POS terminal 106 with the payment object reader 110 using Bluetooth technology, the POS terminal 106 requests the payment object reader 110 to share the authentication data with the POS terminal 106. Traditionally, the requesting device (e.g., the POS terminal 106) is asked to confirm the authentication data being displayed on a display screen of the source device, i.e., the payment object reader 110.

However, as disclosed here, the payment object reader 110 can be smaller, lighter and simpler than readers having integrated keypads or displays. For example, the payment object reader 110 need not include a keypad, a display, an interface for receiving signatures, e.g., a touch screen display, or a cellular connection to a payment processing system on an external network, e.g., the Internet. Through these omissions, the conventional means of pairing, which display the authentication data on a display, are not available. The payment object reader 110, however, includes one or more visual indicators, such as light emitting diodes 124, which can emit light in various colors, intensities, lightness, luminance, and brightness.

Such LEDs 124 are normally included with the payment object reader 110 to be in compliance with the EMV protocol. The EMV protocol mandates the standardization of the electronic payment procedure through two levels of type approval: EMV1 for the hardware and the logical interfaces, and EMV2 for the applications and their features. Thus, the LEDs 124, as per EMV protocol, indicate the operational status of the payment transaction or device. For example, a green LED may be used to indicate successful transaction, while red LED might indicate a failed transaction, and a yellow LED might indicate processing of a transaction. As disclosed herein, the existing LEDs 124 configured to indicate the transaction or operational status are harvested to transmit authentication data, according to some implementations. It will be understood, however, that additional or a separate set of LEDs may be installed specifically for pairing purposes.

Based on the foregoing discussion, following methods and systems described herein provide ways to pair devices by establishing a connection and further securing the established connection between the paired devices, where one of the paired devices does not include an interface for transmitting data through audio, video or tactile mechanisms.

In one implementation, the devices, for example, the POS terminal 106 can be paired to a desired payment object reader 110 using authentication data which can be transmitted through the visual indicators, such as LEDs 124, provided on the payment object reader 110. To do so, the payment object reader 110 converts the authentication data into an optical code, or into any format that is understood by the LEDs 124. This technique is referred to as LED-based technique hereinafter.

For example, a display control component 118 in the payment object reader 110 is configured to convert the authentication data into a specific sequence, color, or animation corresponding to specific alphanumeric data value (the converted data is referred to as optical authentication data 120 hereinafter). In some cases, the authentication data may be dynamic and changing with time. To this end, the display control component 118 can also change colors, chroma, brightness, luminance, lightness, etc., or their sequence, dynamically as the authentication data varies.

The display control component 118 then sends appropriate signals to the LED 124 to emit light as per the optical authentication data 120, for example, by using a specific arrangement or color combinations of LEDs. Besides authentication data, the display control component 118 can also control the LEDs 124 to convert and transmit other kinds of data by modifying the brightness, intensities, lightness, and luminance and color combinations of the LEDs 124. In one implementation, a cluster of red, green, and/or blue LEDs 124 are used to blend light and produce new, collective colors. In this way, several colored LEDs may be combined to cause flexible light sources to respond and change based on user or sensor input. While some implementations focus on color's subtractive property (absorbing some wavelengths and reflecting others), some rely on the additive properties or color mixing. Color mixing relates to when red, green, and blue light—the relative colors for which the chromaticity-sensitive cones in the human retina tend to show an affinity—are combined in equal portions, they produce white light. Changing the relative luminance of any of the three primary light sources results in a change of the combined color of light produced and perceived, and, therefore, conceptually repositions the perceived light's color on the color space. For color mixing, the payment object reader 110 includes a specific cluster of LEDs 124 driven by color-specific LED drivers (not shown). The drivers vary the duty cycle of one color set of LEDs 124 to produce changes in that color set's luminance (or the chromaticity), thereby affecting the resultant perceived color that the cluster produces.

It will be understood that even though LEDs 124 are chosen as visual indicators due to associated long life expectancy, fast switching, high tolerance to humidity, low power consumption and minimal heat generation, other kinds of light sources, such as than incandescent lights, can also be implemented. The LED based technique for pairing is further explained with reference to FIGS. 4 and 5.

In addition or as an alternative to optical authentication data, the devices, for example, the POS terminal 106 can be paired to a payment object reader 110 exhibiting a threshold or predefined received signal strength indicator (RSSI) level. In some cases, the RSSI level is indicative of how close or far the payment object reader 110 is to the POS terminal 106. In other words, to pair a payment object reader, the merchant 108 may bring the reader or the POS terminal 106 within a predefined distance, e.g., from the POS terminal 106 or reader respectively. In this manner, the POS terminal 106 can determine, with reasonable certainty, identification details of the reader with which it wishes to pair. Thus, in some cases, the POS terminal 106 can be paired to the payment object reader 110 having the highest RSSI. In some other cases, the RSSI level can be fixed based on specification of the payment object reader 110, version number, etc. In one implementation, the devices, for example, the POS terminal 106 can be automatically paired to a proximate payment object reader 110 having a specific RSSI. This technique is referred to as signal strength-based technique hereinafter and is explained in detail with reference to FIG. 6.

Once paired, the established communication channel can be further secured using ways similar to the device association or pairing, i.e., the LED or signal strength based pairing processes.

The pairing techniques, as described above, operate on the assumption that the merchant 108 has identified the payment object reader(s) 110 with which the POS terminal 106 is to be paired. Following paragraphs describe systems and/or methods for selecting a payment object reader 110 from amongst a number of readers. In one example, to allow the customer 102 to interact with a POS terminal 106 through a desired payment object reader 110, the POS terminal 106 "discovers" the payment object readers 110 in its vicinity and presents, through a "discovery" option on a web, cloud, or mobile application executing on the POS terminal, a list of neighboring payment object readers 110. The discovery area may be limited or a geo-fence may be set based on communication technology or merchant preferences. As part of discovery, the POS terminal 106 may send inquiry messages on a periodic basis in an attempt to find another Bluetooth-enabled device, such as the payment object reader 110-1. For that, the payment object reader 110-1 wishing to be "discovered" periodically turns on its transceiver and listens for such inquiry messages. The merchant 108 then selects the desired payment object reader 110-1 from amongst the available payment object readers 110 displayed on the list of devices available for pairing.

In one implementation, the devices, for example, the merchant 108 through the POS terminal 106 detects a known alias or proxy address on the list, where the alias corresponds to payment object reader 110-1. The alias may be mapped to a factory-assigned Bluetooth network ID/name or a device registration number associated with the payment object reader 110 in a look-up table. Thus, when the merchant 108 selects the known and unique proxy address, for example from a list of unique proxy addresses presented on a user interface of the POS terminal 106 as a result of the discovery, the POS terminal 106 accesses a look-up table stored either locally on the payment object reader 110 or the POS terminal 106 or any other remote server. Based on the information in the look-up table, the POS terminal 106 generates and sends inquiry messages to the specific payment object reader 110-1. Once an inquiry message is received and approved, the receiving device, e.g., payment object reader 110-1, can send an inquiry response packet (message) containing, among other things, its authentication keys or other pair information data for establishing and securing the connection between the POS terminal 106 and the desired payment object reader 110. As described before, the authentication keys may be shared through, for example, either LED based or signal strength based techniques. Once a communication channel is established and relevant devices are paired, the two devices can exchange secure information with each other.

For example, after a desired payment object reader 110 is paired and secured with the POS terminal 106, the payment object reader 110 and the POS terminal 106 can exchange additional data, e.g., the payment object reader 110 can transmit read-data off the payment objects 104 to process a transaction for a product or service. In an exemplary use-case scenario, the user 102 interested in purchasing an item from the merchant 108 presents the payment object 104 in contact or in a detectable field around the payment object reader 110 to allow the merchant to obtain payment object information (e.g., credit card number, CVV, etc.) from the payment object 104. It is assumed that the payment object reader 110 is configured to receive a payment object 104 or payment object information to process payment transactions (i.e., those involving reading of physical payment object provided by the user at the merchant's location), as well as card-not-present (CNP) transactions (i.e., those where the payment object 104, such as a credit card, is not physically presented at the time that the payment is effected). Examples of card-not-present transactions include transactions involving virtual cards or wallets having financial information stored thereon.

For a payment transaction using a payment object 104, such as a magnetic stripe card, the card can be swiped at the payment object reader 110. The payment object reader 110 sends card data of the magnetic stripe card to the POS terminal 106, for example using an antenna. The POS terminal 106 can be waiting to receive card data from the payment object reader 110, e.g., by scanning for Bluetooth data broadcasts.

For a payment transaction using a payment object 104, such as a smart chip card, the card can be inserted to the payment object reader 110 so that the reader engages electrical contacts for a microchip on the card. The payment object reader 110 sends a PIN request to the POS terminal 106 using the antenna. The POS terminal 106 receives a PIN from the user 102, e.g., entered through a user interface on or connected to the POS terminal 106, and sends the PIN to the payment object reader 110 for confirmation, e.g., wirelessly. The payment object reader 110 sends the PIN to the card, which contains a chip with an embedded PIN. The card compares the received PIN to the embedded PIN. If the PINs match, the card sends a confirmation to the payment object reader 110, which sends the confirmation to the POS terminal 106 wirelessly.

After receiving data, e.g., card data or a confirmation, from either the magnetic stripe card or the smart chip card, the POS terminal 106 can transmit the payment object information to a payment processing system 112 ("PPS 112"); one or more bank computing device(s) 114; and a card payment network computing device(s) 116, e.g., by using an external network such as the network 122, to validate the information and transfer the funds from the user's financial account into the merchant's financial account. The card payment network computing device(s) 116 can communicate the approval or denial to the PPS 112, which can relay the card issuer's approval or denial to the POS terminal 106.

When the transfer of the funds is successful, the transaction is assumed to be processed or completed. Accordingly, a receipt is generated for the user to indicate completion of transaction and details of transaction as proof of purchase.

Similar to the connection between the payment object reader 110 and the POS terminal 106, other devices may also be connected. For example, when the owner or user 102 of a mobile phone serving as payment object 104 enters a store having the payment object reader 110 connected as a point of sale terminal, he or she gets in the BLE or NFC network radius of the payment object reader 110. The connection between the payment object reader 110 and a user device may also be established in the manner described herein. Payment object reader 110 then serves as a bidirectional conduit for the customer 102 to communicate with the POS terminal 106 collecting or handling the credit card transaction.

It bears mentioning that after one instance of successful communication of data, the receiving payment object reader 110-1 (i.e., the device with which the POS terminal 106 paired) may be added to a list of trusted devices. Any future connections with the trusted devices may happen automatically without user intervention or re-executing any of the explicit pairing techniques described above.

Figure 2:
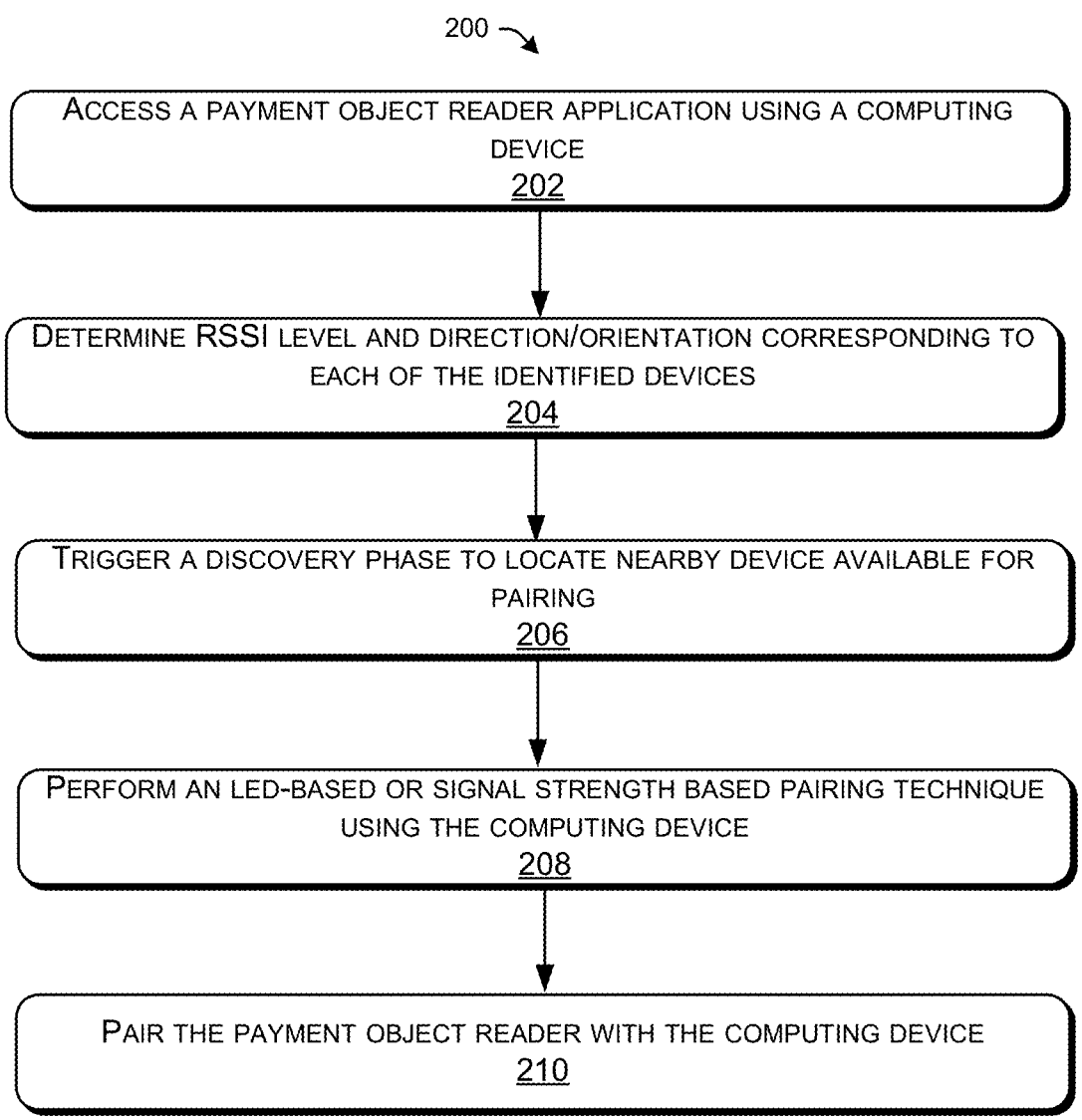
FIG. 2 is a flowchart illustrating the method of enabling and performing Bluetooth communication between the payment object reader and the POS terminal, according to an exemplary embodiment of the present subject matter.

FIG. 2 is a flowchart illustrating the method of pairing two devices, according to an embodiment of the present subject matter. For convenience, the process 200 is described as performed using a mobile computing device, e.g., the POS terminal 106, and a payment object reader, e.g., the payment object reader 110-1.

A user, e.g., a merchant 108, accesses a pairing application using POS terminal 106 (step 202). When accessed, the pairing application triggers the discovery mode (step 204). When the payment object reader 110 is in discovery mode, the POS terminal 106 can search for and locate the payment object reader 110 with which the merchant 108 wishes to interact. As part of the discovery phase, the POS terminal 106 can also access an identifier associated with the payment object reader 110 that identifies the alias of the payment object reader 110, model of the payment object reader 110, and a version or registration number, e.g., a firmware version number, of the payment object reader 110.

Through the discovery mode, the pairing application lists the devices that are available to be paired with the POS terminal 106. The pairing application may determine the list based on, for example, the current location of the POS terminal 106. Using the location, the pairing application lists all devices that lie within a predetermined network area. For the sake of example, assume that the payment object readers 110-1 and 110-2 (collectively referred to as payment object reader 110) are near POS terminal 106.

The user then configures a payment object reader 110 for pairing mode to allow it to be discovered and/or be prepared for pairing (step 206). Depending on the configuration of the payment object reader 110, the payment object reader 110 can be configured in multiple ways. One implementation includes pressing and holding a pairing button located on the payment object reader 110, as described in reference to FIG. 8.

By activating the pairing mode on the payment object reader 110, the user can initiate the pairing process (step 208). Subsequently, the user performs a pairing technique using the POS terminal 106. Depending on the implementation, the pairing technique can be a signal-strength based pairing technique, as described in reference to FIG. 6, or a LED based pairing technique, as described in reference to FIGS. 4 and 5.

In some implementations, the POS terminal 106 determines which pairing technique to use based on data (e.g., registration number associated with the payment object reader 110) that is received from the payment object reader 110 during the device discovery phase.

Based on the technique either automatically chosen by the POS terminal 106 or manually by the user, the pairing application can provide the user with instructions on how to pair a specific payment object reader. The user can interact with the payment object reader 110 through the POS terminal 106 once the pairing technique is performed successfully (step 210). For example, the pairing technique is performed successfully when the user correctly verifies the color code, also referred to as optical authentication data, being flashed on the LEDs 124 associated with the payment object reader 110, or when the user successfully adjusts the location of the payment object reader such that the signal strength is optimal, as instructed to the user on the POS terminal 106.

Figure 3:
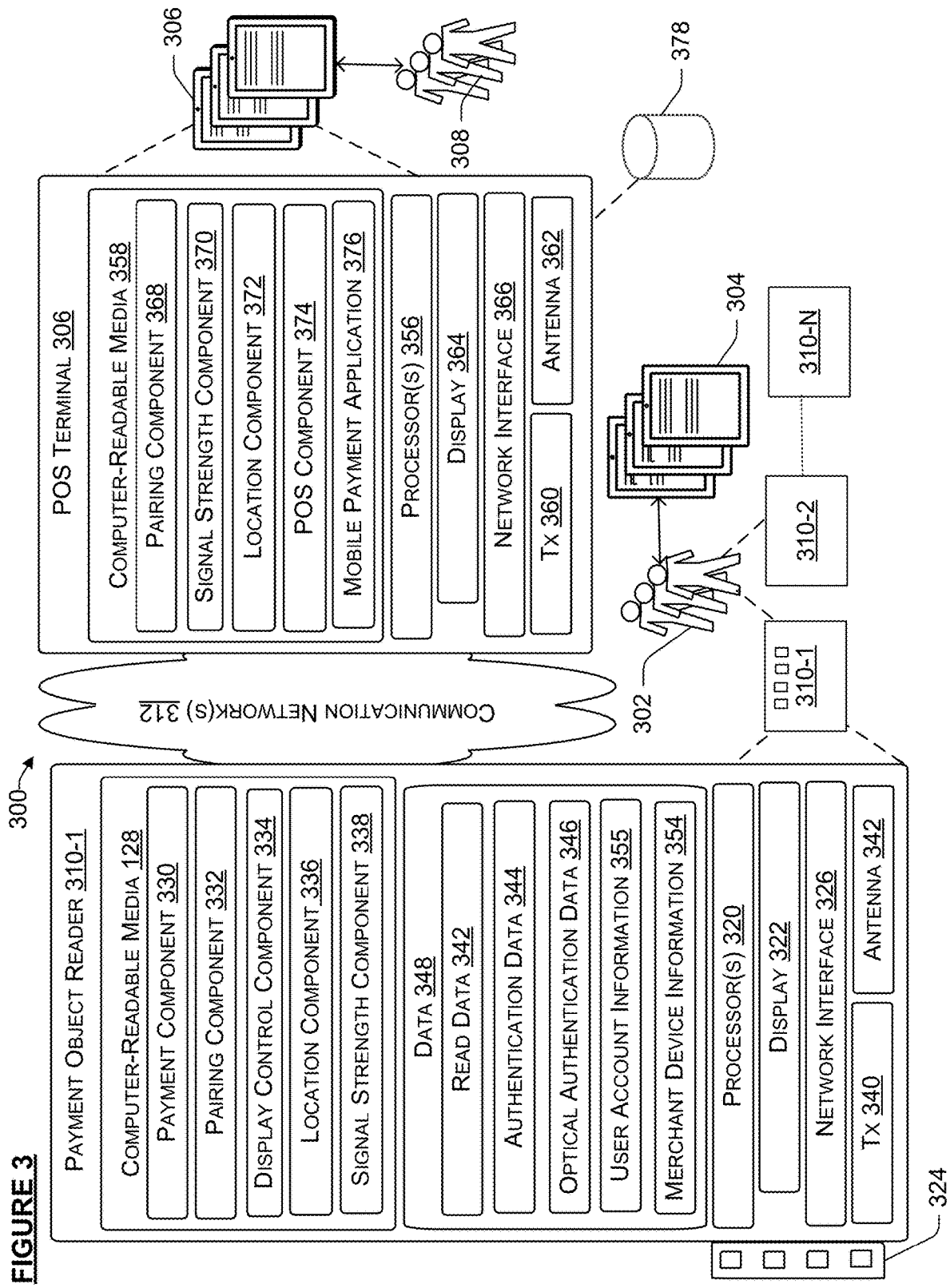
FIG. 3 illustrates various components within the payment object reader and the POS terminal that enable pairing and thereby, wireless communication between the payment object reader and the POS terminal, according to an embodiment of the present subject matter.

FIG. 3 illustrates various components within the payment object reader and the POS terminal that enable pairing and thereby, wireless communication between the payment object reader and the POS terminal, according to an embodiment of the present subject matter. In one implementation, the system 300 includes a POS terminal(s) 306, belonging to a merchant 308, and one or more payment object readers 310-1, 310-2, . . . , 310-N (interchangeably and collectively referred to as payment object reader 310) connected or capable of communicating through communication network 318. In some implementations, the payment object reader 310-1 may be similar to payment object reader 110 in construction and operation. Similarly, in some implementations, the POS terminal 306 may be similar to POS terminal 306 in construction and operation. As shown in FIG. 3, the POS terminal 306 may also be connected to a payment processing system, a bank computing device, and a card payment network computing device (not shown), through via the communications network(s) 312 or a different network.

Even though the architecture of only payment object reader 310-1 is shown, it will be understood that other payment object readers may include similar program components and data. Furthermore, the merchant 308 and the payment object reader 310-1 can also interact with each other. For example, the interaction of the merchant 308 may be in the form of card swipe or card insertion into the payment object reader 310-1. Furthermore, while the payment object reader 310-1 may be shown to be external to the POS terminal 306, in some implementations, the payment object reader 310-1 may be a component within the POS terminal 306 or directly connected to the POS terminal 306, for example through a universal serial bus (USB) connection or the audio jack of the POS terminal 306. In embodiments where there is a wired connection between POS terminal 306 and payment object reader 310-1, pairing may either be established over the wired connection or pairing may be over a wireless connection and the wired connection may be for power transfer or data transmission, for example.

In one implementation, the payment object reader 310-1 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain payment transaction data off a payment object 304. Accordingly, the payment object reader 310-1 may include hardware implementation, such as slots, magnetic tracks, and rails with one or more sensors or electrical contacts to facilitate detection and acceptance of a payment object 304. The payment object reader 310-1 may also include: one or more processor(s) 320; a display 322 having one or more visual indicators such as light emitting diodes 324 with or without any keypad, touch-screen or other input device for the user 302 or merchant 308; a network interface 326; and computer-readable media 328.

The processor core may be a low-power/ultra-low power/low-cost microcontroller; examples include an Intel Processor like Intel Atom, Apple A4, NVidia Tegra 2, Marvell Armada, Qualcomm Snapdragon, Samsung Hummingbird and Exynos, Texas Instruments OMAP and MSP microcontroller, ARM Holdings processor like the Cortex-A, -M -R, Series, or ARM series and/or the like processor(s).

The computer-readable media 328 stores a payment component 330, a pairing component 332, a display control component 334, a location component 336, and a signal strength component 338. In one implementation, the payment component 330 is configured to detect and receive payment information from a payment object 304 introduced in or around the payment object reader 310. The various components shown in FIG. 3 can be implemented by using hardware, software, firmware or a combination thereof, including one or more signal processing and/or application specific integrated circuits. Further, the environment 300 of FIG. 3 can be implemented based on other architectures in other embodiments.

The pairing component 332 controls and modifies the pairing parameters or authentication data in order to pair the payment object reader with any peripheral device, including POS terminal 308. The pairing component 332 is also used to receive authentication data and convert that data into optical authentication data to be displayed on the display 322. The display control component 334 controls the intensity, color, and strength of brightness of the LEDs 324, for example in response to input received from the pairing component 332. The location component 336 in conjunction with GPS units, determines the location coordinates of the payment object reader 310 at any time. The location component 336 can also determine the distance between the payment object reader 310 and any other peripheral device including the POS terminal 306. The signal strength component 338 determines the network connectivity strength of devices in the vicinity of the payment object reader 310 by receiving signals emitted by neighboring devices.

The display 322 may provide various functionalities for accessibility, such as vibrating, sounding, lighting an indicator, such as light emitting diode (LED) 324, or displaying other lights, color, or animation on a screen display to communicate a specific digit or value of a digit, or even status of the payment transaction or device. Furthermore, the LEDs can be controlled to deliver other kinds of data by modifying the intensities and color combinations of the LEDs 324.

Such LEDs may already be included in a payment object reader 310 to be in compliance with EMV specifications. In one implementation, interface 322 and the LEDs 324 may be used to optically transmit pair communication data or authentication data 344 to a merchant 308 attempting to couple the POS terminal 306 with the payment object reader 310. In such implementations, the display control component 334 converts the authentication data into a color code, which can be transmitted as optical authentication data 346 using a specific arrangement or color combinations of LEDs. The display control component 334 can also modify the signals into the LEDs 324 to change colors dynamically in response to varying values of authentication data 344. Thus, it is possible to use a LED display system for both optical display of transaction status and to broadcast pair information data through LEDs.

The payment object reader 310 may also include one or more wireless transceiver(s) 340 connected to antenna(s) 342, thereby enabling wireless transmission and reception of various communication and/or sensor protocols. For example the antenna(s) 342 may connect to a transceiver chip or a wireless microcontroller targeting Bluetooth applications, e.g., providing 802.11n, Bluetooth 4.2, Bluetooth 2.1+EDR, FM, GSM/EDGE/GPRS/2G/3G/HSDPA/HSUPA/LTE (4G) communications, global positioning system (GPS) thereby allowing the payment object reader 310 to determine its distance, for example, from the POS terminal 306. There may be either one transceiver capable of handling communication on the protocols mentioned above, or there may be a transceiver configured for each protocol. Thus, there may be a Bluetooth transceiver, a Wi-Fi transceiver, an NFC transceiver, and so on. The transceiver 340 may communicate with the location component 336 to determine the location of a merchant 308 or customer 302 performing a payment transaction via payment object 304. In one implementation, the location information may be used to pair a specific payment object reader 310 amongst a plurality of payment object readers 310. The payment object reader 310 may also include a database 348 to store data read off a payment object 304 (the data is hereinafter referred to as "payment object read-data" or "read-data" 350), user account information 352, and POS terminal or POS terminal information 354. The authentication data 344 and optical authentication data 345, i.e., data broadcasted via the LEDs 324, can also be stored in the database 348.

In various embodiments, the network interface 326 may support wireless data transfers between the payment object reader 310 and the POS terminal 106. Wireless protocols may include Wi-Fi (e.g. IEEE 802.11a/b/g/n, WiMax), Bluetooth® or Bluetooth low energy (BLE); infrared, and the like, through BLE interface, WiFi interface, QR interface, NFC interface, EMV interface, cellular technology interface, and other interface(s). According to one implementation, the network interface 326 can be a BLE interface ("BLE") that is configured to work on Bluetooth or BLE protocol to facilitate communication with the transceiver installed on other devices. In one implementation, BLE is intended for low-power and low-latency applications for wireless devices within a short range, such as up to about 50 meters. BLE interface may be used in applications requiring intermittent communications, smaller amounts of data transfer and bandwidths, and/or low duty cycles. BLE interface can be configured to use only a fraction of the power as compared to other interfaces. In many cases, BLE interface may be able to operate more than a year on the power source without charging.

BLE interface is capable of being paired with interfaces of a peripheral device, such as a POS terminal 306 associated with the merchant 308 or payment object reader 310, thus allowing the payment object reader to serve as a "beacon" and broadcast read-data. To this end, the embodiments described herein pair a desired payment object reader to a specific POS terminal 306. As defined herein, a beacon is a short-range communication device having a known or fixed location that provides a signal that can be detected by mobile devices within proximity of the beacon. For example, BLE interface can transmit a radio frequency (RF) signal that includes its position coordinates (e.g., latitude, longitude), which can be detected by a mobile device. Alternatively, BLE can transmit other data, such as pair information data of the payment object reader 304. In one implementation, the pairing component can convert a factory-set pair information data to static or constantly varying string of colors, brightness, or intensities.

The payment object reader 310 as BLE beacon allows for constant, scheduled or random scanning of other Bluetooth peripherals and devices. In one implementation, a component, such as BLE interface component, within the payment object reader 310 can be set to run in the background under a BLE protocol, persistently, intermittently or on activation monitoring for a significant change in location and/or presence of an appropriate BLE peripheral or beacon at a merchant or vendor location. BLE beacon also allows for persistent or intermittent transmission of data. For example, BLE beacon may persistently transmit or receive information related to pair information data.

For the sake of simplicity of discussion, the internal architecture of only one payment card reader 310-1 is shown. Other payment card readers may be similar or different than the payment card reader 310-1. The architecture of an exemplary POS terminal 306 is now discussed.

In one implementation, the POS terminal 306 (also referred to as the merchant device 306) may include one or more processor(s) 356, computer-readable media 358, POS transceiver(s) 360, an antenna 362, a display 364, and a network interface 366. The computer-readable media 358 may store a pairing component 368, a signal strength component 370, location component 372, and a POS component 374. Similar to the payment object reader 310, there may either be one transceiver 360 capable of handling communication on the protocols mentioned above, or there may be a transceiver 360 configured for each communication protocol. Thus, there may be a Bluetooth transceiver, a Wi-Fi transceiver, an NFC transceiver, and so on.

The POS component 374 can be configured to receive payment information derived by a payment object reader 310 from a payment object 304 introduced in or around the payment object reader 310. The pairing component 368 can be configured to control and modify its own pair information data or authentication data in order to pair the POS terminal 306 with a payment object reader 310 or any other peripheral device. The pairing component 368 can also receive pair information data from surrounding devices, e.g., the payment object reader 310 and store such data in program data 378. The pairing component 368 also controls presentation of the neighboring Bluetooth enabled devices on the display 364 in the form of an interactive or static list, record, etc. In some embodiments, mobile payment applications 376 may run on the POS terminal 306. Such payment applications may generate a graphical user interface to be displayed on display 364 to allow a merchant 308 or a user 302 to manually enter payment information, such as debit account information, or make selections with respect to the payment object reader 310. Thus, the payment applications may also allow the merchant 308 to pair the POS terminal 306 to a specific payment object reader 310 of interest. The POS terminal 306 may include a POS Bluetooth transceiver 360, which when activated, may detect the payment object readers 310, which have their respective Bluetooth transceivers 340, enabled.

Furthermore, the location component 372 in conjunction with GPS units, can determine the location coordinates of the neighboring payment object reader(s) 310 at any time. The location component 372 can also determine the distance between the POS terminal 306 and another payment object reader 310. The signal strength component 370 determines the Bluetooth network connectivity or signal strength indication of devices, such as the payment object readers 310.

For example, the received signal strength indicators (RSSI) corresponding to the Bluetooth transceivers 340 from each of the payment object readers 310 may be received and stored in program data 378. In another example, RSSI corresponding to NFC or Wi-Fi transceivers 340 may also be received and stored in program data 378. In one implementation, a combination of RSSIs from the Bluetooth and NFC/Wi-Fi receivers 340 may also be computed and stored in program data 378.

In some implementations, the communication network(s) 312 may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the one or more networks 312 may include both wired and/or wireless communication technologies, including Bluetooth®, Bluetooth® low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally, the communication network 312 may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

Figure 4:
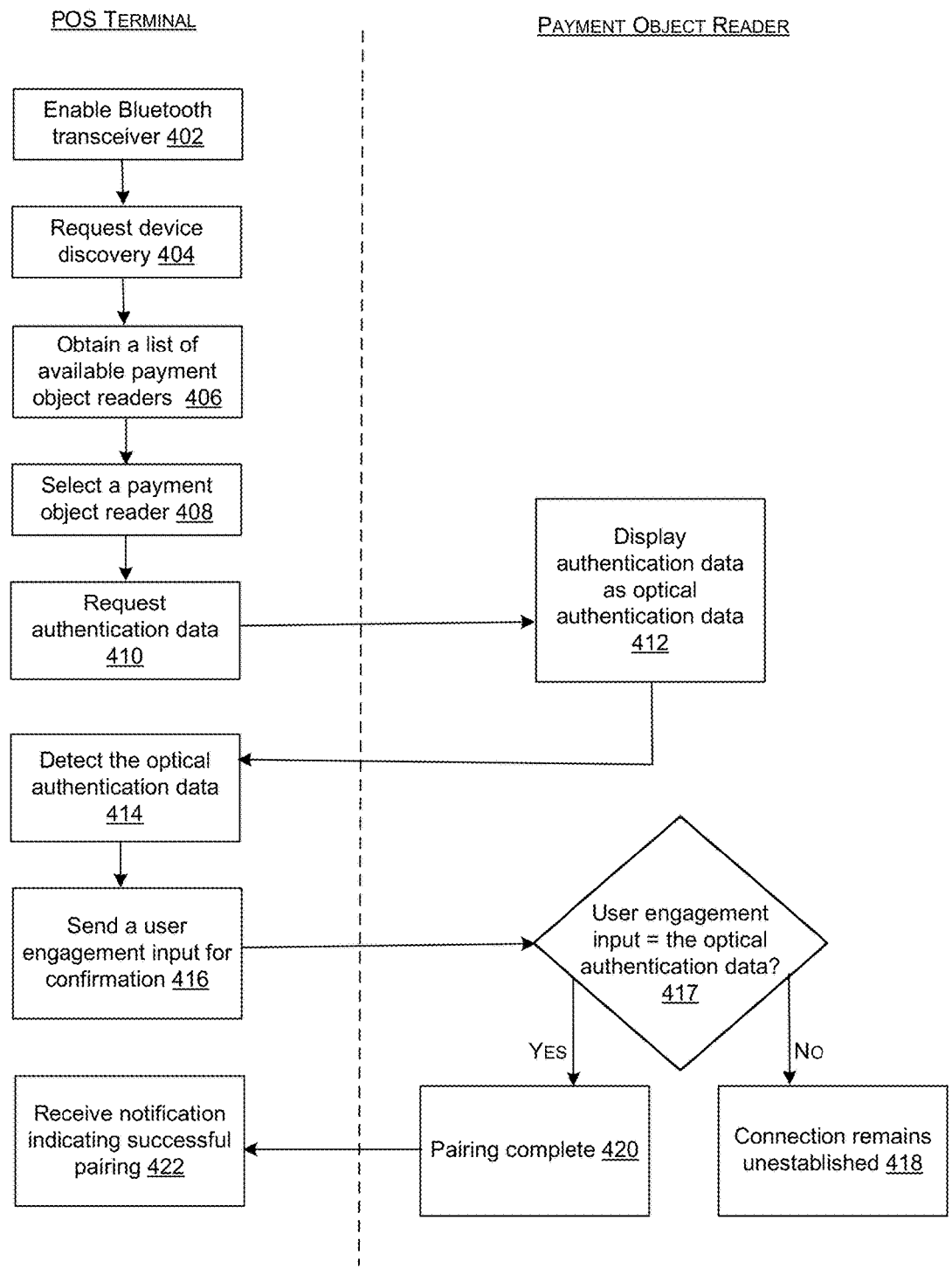
FIG. 4 is a dataflow that illustrates the method of enabling wireless, such as Bluetooth, communication between the payment object reader and the POS terminal based on an LED-based pairing technique, according to an exemplary embodiment of the present subject matter.

FIG. 4 is a dataflow that illustrates the method of enabling wireless, such as Bluetooth, communication between a payment object reader and the POS terminal based on the LED-based pairing technique, according to an exemplary embodiment of the present subject matter. Components of FIG. 3 have been used to clarify some aspects of the method flow. Initially, a merchant enables the Bluetooth transceiver of its POS terminal, e.g., POS terminal (step 402), for example, by toggling a switch that is in turn connected to an antenna. By enabling a Bluetooth toggle switch, the method automatically enables the device discovery. Optionally or additionally, the merchant may explicitly request device discovery through a user input (step 404). Device discovery facilitates a merchant to discover one or more devices, in a network defined by Bluetooth standards, with which it may want to communicate. By enabling the transceiver, a wireless signal is emitted from the POS terminal that is used to detect wireless signals from other Bluetooth-enabled devices, such as payment object readers 310 whose Bluetooth transceivers are enabled. Thus, in response to device discovery, the list may show two payment object readers 310-1 and 310-2 in the vicinity. The order of the payment object readers 310-1 and 310-2 on the list may be based on the signal strength or proximity of the payment object readers 310 from the POS terminal 306. The method includes obtaining a list of available payment object readers 310 (step 406) and displays in a manner that is either fixed or based on user preference. In one implementation, the merchant may change the order or preference of the payment object reader shown on the list or even introduce a new payment object reader, for example 310-3, into the list by physically moving the desired payment object reader closer to or further away from the POS terminal 306. By moving the payment object reader 310-3 closer, e.g., within an inch from the POS terminal 306, chances of discovery can be increased. The merchant 308 via the interface of the mobile application on the POS terminal 306 then selects at least one payment object reader 310 from amongst the available devices for pairing (step 408). In an example illustration, assume the selected payment object reader is payment object reader 310-1. When a merchant 308 selects a payment object reader 310 from the list of available devices, the application 376 may request for additional information, e.g., authentication data 344 or security keys, or obtain such information for confirming Bluetooth connection between the two devices (step 410). At this stage, the payment object reader 310-1 may have been either persistently displaying or on receiving an audio/visual/haptic input, display authentication data in the form optical authentication data 346 through the visual indicators 324 (step 412). For example, the authentication data 344 may either be a color code or be converted from a string of numbers into a code of colors, brightness or intensities. In one implementation, the LEDs 324 configured to present status of a transaction may be configured to display a unique color or chroma pattern representative or indicative of the authentication data. In one example, the first LED may be emitting green light, the second LED may be red, the third LED may be green and the fourth LED may be red.

The optical authentication data 346 may either be human perceptible or human-imperceptible but machine perceptible. If it is human perceptible but not machine perceptible or imperceptible, the merchant may visually inspect or read the optical authentication data 346 comprised of colors and enter the optical authentication data as-is when prompted. The method includes generating a color wheel or palette for the merchant to submit the optical authentication data 346 as user input by selecting the colors from the palette. If it is human imperceptible as well as machine perceptible, the merchant may use an image capturing device 401, such as camera or image sensor, associated with the POS terminal to capture a sensor input in the form of an image of the sequence of colors in which the LEDs are on. Thus, the method includes receiving the optical authentication data 346 as perceived or seen by the merchant 308 or a sensor or an image-capturing device 401 as a user input or sensor input respectively on the POS terminal 306 (step 414). The method includes sending the information to the payment object reader 310-1 for verification (step 416). The payment object reader 310-1 compares the user input with the actual optical authentication data 346 (step 417). If the verification is not successful, i.e., if the user input does not match the optical authentication data 346, the connection remains un-established (step 418). The payment object reader 110-1 may block repeated unsuccessful attempts by exponentially increasing the amount of time mandated between attempts. This technique prevents attackers who perform offline attacks from searching the space of all possibilities and combinations of authentication data.

However, if the verification is successful, i.e., if the payment object reader 310-1 deems the user or sensor input to match the optical authentication data 346, the pairing is complete (step 420). The method includes sending the confirmation onto the POS terminal 306 and/or stored in database of both the devices so that the connection remains established the entire time information is being shared (step 422). The paired devices can then exchange information between each other; information such as payment information obtained from the payment objects. Even though the description relates to transmitting and receiving authentication data for pairing, it will be understood that security tokens may also be transmitted, for example, using the channel for authentication data or a separate channel. Furthermore, the authentication data and the security token may either be sent together as one data packet or sequentially.

The above method uses authentication data and its derivatives or representations to pair two devices. In some cases, RSSI levels and authentication data may be used together for an alternative or additional level of security. For example, the payment object reader 310 may couple only to devices that are at a predefined distance away (such as a distance within the Bluetooth or BLE network), confirmed using the RSSI levels or even the location coordinates, obtained using the signal strength component 338 and the location component 336, respectively.

In some implementations, embodiments of the methods and systems described herein can pair a payment object reader to the POS terminal with protection from MITM attacks. MITM is an attack by a rogue device which attempts to insinuate itself into the legitimate Bluetooth "trust dialogue" during pairing. While the two victim devices are attempting to discover (find) each other and pair (interactively communicate) with each other for the first time, an attacker's rogue device in between the two legitimate devices attempts to respond to both of the victims' devices in order to compel them both to believe they have found each others' (legitimate) device, when, in fact, they're only each communicating with and/or through the attacker's rogue device (which then facilitates indirect communication between the two victim devices through the rogue intermediary). In this way, the attacker's device gains full trust from both devices.

Some Bluetooth devices pair using a Secure Simple Pairing (SSP). SSP introduces four Association Models for pairing, namely: Pass Key Entry, Out-Of-Bounds (OOB), Numeric Comparison and an association option in the Bluetooth standard known as "Just Works". The choice of which model is used is based on the input and output capabilities of the two devices to be paired. The first three models (Pass Key Entry, OOB and Numeric Comparison) provide protection against the MITM attack, whereas the Just Works model generally does not. This is because the Just Works model is used when there is no display for output and no keyboard for numerical input on at least one of the two devices and, therefore, it provides no mechanism to verify that the two devices are communicating directly with each other instead of through an attacking device. The Just Works model begins just as the Numeric Comparison model does by generating a password but since there is no display for output, Just Works assumes user confirmation and proceeds with pairing without actual user confirmation. Without the user confirmation of the 6-digit number, Just Works model is vulnerable to the MITM attack.

As described herein, the LED scheme allows the payment object reader 110 and the terminal protection from attacks by providing methods to pair and obtain user confirmation especially in cases where a display is not available for displaying the password.

Figure 5:
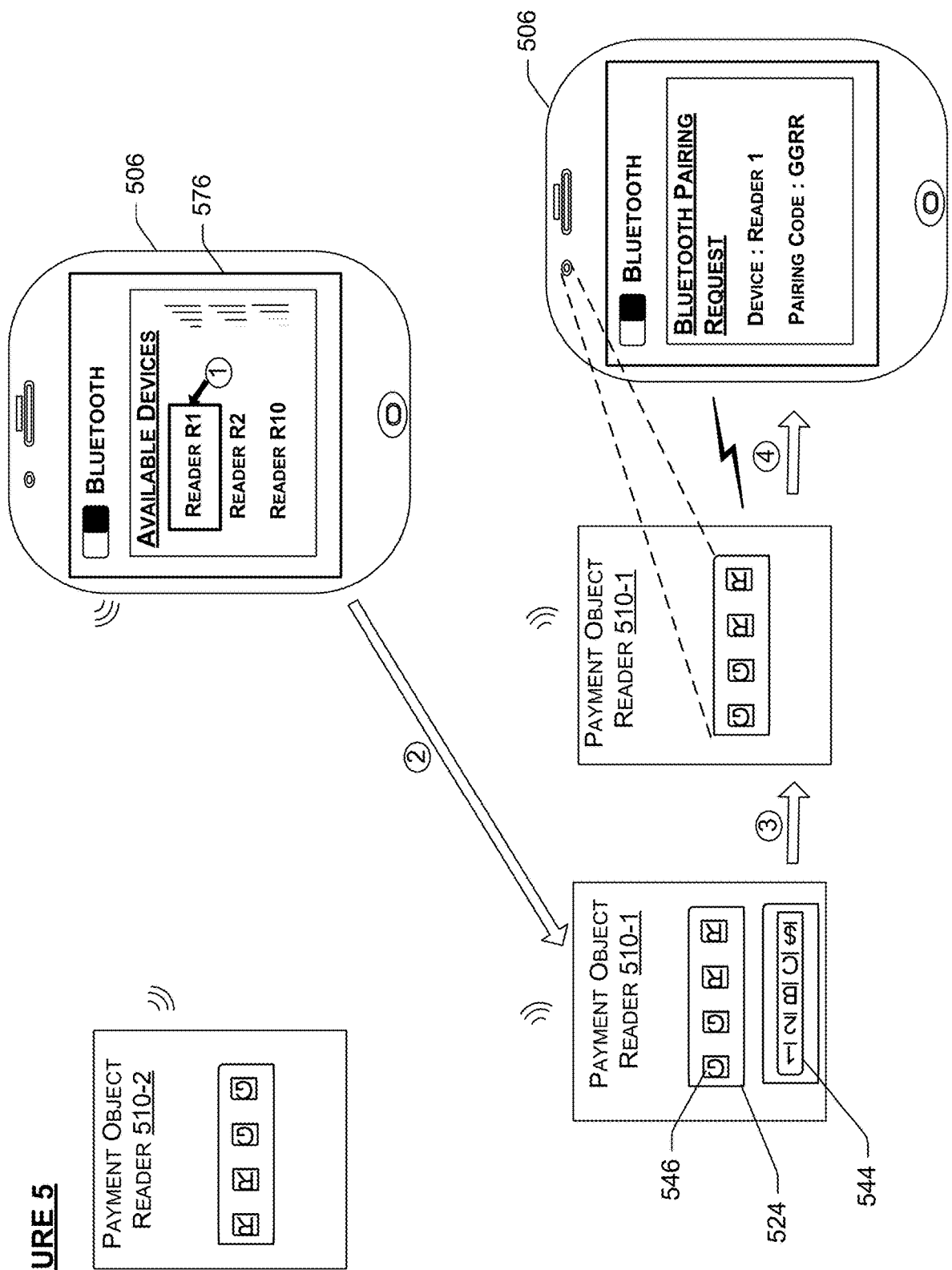
FIG. 5 is a block diagram illustrating a use case in which Bluetooth communication between the payment object reader and the POS terminal is enabled using the LED-based pairing technique, according to an exemplary embodiment of the present subject matter.

FIG. 5 is a block diagram illustrating a use case in which Bluetooth communication between a payment object reader 510 (e.g., payment object reader 510-1 or 510-2) and the POS terminal 506 is enabled using LED-based pairing technique, according to an exemplary embodiment of the present subject matter. In one implementation, the devices, for example, the POS terminal 506 pairs with a desired payment object reader 510 by converting authentication data 544 into optical authentication data 546, which can be transmitted through one or more visual indicators, such as LEDs 524, associated with the payment object reader 510. The optical authentication data is shown to be connected or mapped with the authentication data 544 using dotted lines. The database relationship between the two and structure of the authentication data may be represented in any form. The visual indicators are used both to indicate the status of transaction, however, the present subject matter utilizes existing, and in some cases, unused hardware and software components for displaying authentication pairing data as well.

Referring to FIG. 5, the block diagram illustrates exemplary systems and entities to enable wireless communication, e.g., Bluetooth communication, between a desired payment object reader 510, for example payment object reader 510-1, and the POS terminal 506. As shown, the payment object reader 510-1 and 510-2 may each include one or more visual indicators formed by LEDs 524 or any such light emitting source, that can provide a visual signal in the form of visible light rays and where the visible light rays transmit and broadcast authentication data (or a variant or representation thereof) for Bluetooth pairing. The number, arrangement and orientation of the LEDs is only exemplary and for discussion purposes only and should not be considered limiting. In one example, the visual indicators may emit light of different colors, brightness, and intensities. Each unique combination of such colors, brightness, luminance, chrominance, and/or intensities is representative or indicative of the authentication data 544 in an optical format, referred to as optical authentication data 546. Such data can be used to share information and/or pair the payment object reader 510 with any computing device having Bluetooth capabilities. While visual indicators have been described in detail, it will be understood that other kinds of visual, audio and tactile indicators may also be used. Examples include, but are not limited to, a one or two dimensional symbol, a bar code, a QR code, a static or dynamic string of colors in a color space, or any other optical information, audio signals, type of code or digital representation of information that takes the form of a non-alphanumeric pattern. In other embodiments, the optical authentication data 546 may be made up of alphanumeric patterns.

The payment object reader 510 generates optical authentication data 546 in response to a request, e.g. a request for pairing by a POS terminal 506. In other embodiments, the payment object reader 510-1 generates the optical authentication data 546 when the payment object reader 510-1 is placed near or within a predetermined distance from the POS terminal 506. The optical authentication data 546 may include information that is needed to establish a secure connection between the payment object reader 510-1 and the POS terminal 506. For example, the optical authentication data 546 may include a sequence of color combination, e.g., green (G), green (G), red (R), red (R), which may be unique to the payment object reader 510-1 and displayed through the visual indicators. The unique combination allows establishing of a secure handshake between the payment object reader 510-1 and the POS terminal 506. To pair with another payment object reader 510-2, a different sequence of colors, e.g., red (R), red (R), green (G), green (G), is generated by the payment object reader 510-2. The colors are represented by the first initials. Instead of colors, the sequence can be of brightness, luminance, or intensities or the sequence of LED's that are on or off. Instead of the payment object reader 510-1 and 510-2 generating unique codes, an external server, e.g., PPS (not shown in this figure) generates codes specific to a reader and sends it to the reader or directly to the POS terminal 506 through the Internet, or an already established communication network.

In one implementation, the optical authentication data 546 may be related to the actual authentication data 544, which is generally a numeric or alphanumeric set of characters. The mapping between the authentication data 544 and the optical authentication data 546 may be performed internally within the payment object reader 510 through the pairing component 532. For example, a factory-assigned Bluetooth authentication data 544 of 16 digits can be mapped to a four-color optical authentication data 546. For example, the 16 digits may be divided into sets of four. Digits in each set may be added until a single digit is obtained. Each digit may then be assigned a color. Accordingly, four colors may be obtained corresponding to the four sets. In another example, instead of digits, colors representing the digits may be combined, until a shade of a certain color is obtained. This shade will be a unique color obtained only by blending the colors representing the digits in the specific order.

In the absence of a conventional display, the payment object reader 510 displays optical authentication data 546 using the visual indicators 524 which are also used to show status of transactions. In case a processing of transaction is in the works, the payment object reader 510 may temporarily suspend pairing operation. In another implementation, the payment object reader 510 may perform an override if pairing takes priority over other actions.

In some cases, the optical authentication data 546 may be human-perceptible, and as such visible to the naked eye. To this end, the merchant may access a graphical user interface of a local application or a web application 576 through the POS terminal 506 to detect the payment object readers 510 available in the communication network of the POS terminal 506. For example, the merchant 108 may initiate a discovery mode on the POS terminal 106 to obtain a list of devices available for pairing. As shown, a web, cloud or mobile application 576 executing on the POS terminal 506, when accessed, may display, on a first screen, a list of devices that have their Bluetooth transceivers 140 enabled. In this example, payment object reader 510-1, labeled reader 1, and payment object reader 510-2, labeled reader 2, are shown. Additionally, a signal strength component may also indicate the proximity information or signal strength associated with a payment object reader 510 in relation to the POS terminal 506. The merchant may choose a specific payment object reader 510, based on signal strength, distance or merchant preference. Once selected, another screen, e.g., a pop-up screen, may be displayed prompting the merchant to enter optical authentication data 546 as visible to the merchant. Thus, as shown, the merchant can visually inspect the visual indicators of the payment object reader 510 and subsequently, open an application 576 to enter the inspected colors, e.g., green, green, red and red or GGRR, as user or sensor input to pair with the payment object reader 510-1. Alternatively, a color, brightness or intensity palette may be presented for the merchant to select a sequence of colors or a specific color from the palette, to match with the optical authentication data 546. The payment object reader 510-1 or a central server compares the optical authentication data 546 with the user or sensor input to confirm the connection. Furthermore, the payment object reader 510-1 obtains the user or sensor input, which may be in a form resembling the optical authentication data 546, to decode using an optical decoder (not shown), which may operate based on the encoding method to determine the actual authentication data 544 from the user input. In response to a confirmation of the optical authentication data matching the user input, and once an authenticated connection is established, a secure connection may be established by sharing security keys or tokens between the POS terminal 506 and the now-authenticated payment object reader 510 in a similar manner. For example, the security keys can also be converted into optical security data and displayed by adjusting the color, brightness or intensity of the visual indicators 524. The merchant may then enter the visible security data.

In some cases, the optical authentication data 546 may be invisible or otherwise human-imperceptible but machine-perceptible. Such data may only be captured by an optical image-capturing device, such as a scanner, image sensor, or camera, associated with the POS terminal 506. Once captured, the image of the optical authentication data 546 as received may be decoded and compared with the real authentication data 544 by sending the image or the decoded data back to the payment object reader 510. The payment object reader 510 and POS terminal 506 may also be configured to provide a haptic or visual/auditory output to notify a user of each respective computing device of a particular condition of the computing device. For example, POS terminal 506 may provide a haptic output, a visual notification, an auditory notification or a combination thereof to notify a merchant 108 that the payment object reader 510 has generated an optical authentication data 146 for display. Likewise, POS terminal 506 or the payment object reader 510 may be configured to output similar notification when the pairing between the devices has completed.

In some cases, the sharing of authentication data only establishes a communication channel. In some cases, the POS terminal 506 and the payment object reader 510 further establish the communication channel as secure. In one implementation, the POS terminal 506 and the payment object reader 510 do so by sharing payment token(s) stored or accessible via the payment object reader(s) 110, over the established communication channel. A payment token can also be a derivative of the optical authentication data 546 with static or dynamically changing numbers, which map to the optical authentication data 546. The payment token may be combined with a dynamic cryptogram that prevents the token from being reused. In another implementation, the payment object reader 510 may tokenize optical authentication data 546 such that the optical authentication data is replaced with a random set of characters structured in a similar format to the original optical authentication data, but with no relationship whatsoever. Alternatively or additionally, the optical authentication data 546 can be encrypted using Triple Data Encryption Algorithm (commonly known as "Triple DES"), Advanced Encryption Standard ("AES"), or other encryption techniques.

In one implementation, the payment tokens may be sent over the same channel as the channel on which authentication data 544 or 546 was exchanged and verified. In another implementation, the payment tokens may be sent over unencrypted channels. In yet another example, the payment object reader 510 may broadcast an encrypted security token that is received by the POS terminal 106 or an application 576 running thereon. The encrypted security token can be sent to the PPS for decryption based on predefined rules and identity of the payment object reader 510. The decrypted security token is then sent to the POS terminal 506 via secured communication channel between the POS terminal 506 and the PPS. The merchant can enter the decrypted security token for pairing purposes.

In some cases, the authentication data 544 and payment token can be sent using the same channel and at the same instant by implementing, for example out of band pairing methods. For example, the data stream can be substantially of the form:
<start byte> <optical authentication data><security token> <end byte>

Once the communication between the payment object reader 510 and the POS terminal 506 is secured and established using Bluetooth or any other wireless protocol, the network can accept payment objects, such as virtual wallets or contactless payment methods, to process and fulfill payment transactions. Thus, the payment information (tokenized or otherwise) obtained, from a user or by reading the payment object, may be transmitted between the POS terminal 506 and the desired payment object reader 510 (now serving as a companion device) through respective Bluetooth transceivers. The payment information can be sent to a PPS. For example, the computing device 506 sends data read from the payment card, e.g., the cardholders name, credit card number, expiration date and card verification value (CVV), to PPS via a communication network. The computing device 506 may also send information of the merchants or their accounts to which the funds have to be transferred; such information may include a merchant identification number, merchant financial account information, etc.

In one example, payment information may be sent at the end of each transaction along with a fund transfer request. In another example, the merchant stores authorized transactions in a batch, and sends the batch to the PPS or other entities at the end of the day to receive payment.

The PPS collates the data before sending the collated data to a computer system of the merchant's bank or financial institution (hereinafter "bank computing device") that processes payments (e.g., credit or debit card payments) and assumes risk on behalf of a merchant. The bank computing device sends the collated to the computer system of the card payment network (e.g., Visa, MasterCard, Discover or American Express) (hereinafter "card payment network") to determine whether the transaction is authorized or deficient in any other way. The card payment network can also be connected to a bank or financial institution that offered a financial account (e.g., credit or debit card account) to the customer. The issuing bank makes a determination as to whether the user's payment instrument is valid and whether the user's payment instrument has the capacity to absorb the relevant charge associated with the transaction. If the issuer and/or the card payment network approve the transaction, a payment authorization message is communicated from the issuer to the merchant computing device 506 via a path opposite of that described above. Each of the aforementioned computer systems can include one or more distinct physical computers and/or other processing devices, which, in the case of multiple devices, can be connected to each other through one or more wired, and/or wireless networks. All of the aforementioned devices are coupled to each other through networks including intranet, the Internet, a cellular network, a local area network, a wide area network, or any other such network, or combination thereof. The communication network may also be a mesh network. For example, in a wireless local area network (WLAN), network devices may be configured to receive and forward communications, which are ultimately destined for a different device. Protocols and components for communicating over such a network are well known and will not be discussed herein in detail. Furthermore, the payment system, the POS terminal, and the user device can communicate over the network using wired or wireless connections, and combinations thereof.

Responsive to the authorization, the PPS may be programmed to collect transaction information. The PPS can collect the transaction information from various parties, such as the computing device 506, the acquirer, the issuer and the card payment network. The transaction information of a transaction can include, e.g., an amount of the payment transaction, the method of payment, an identification of the associated financial account, an identity of the merchant, and item-level information. The item-level information relates to the goods or services involved in the payment transaction. The item-level information can include names, identification numbers, prices, tax, discounts and other price adjustments, and/or descriptions of the goods or services. For example, item-level information of a purchase in a coffeehouse can include information such as tea latte and blueberry muffin (i.e., names), SKU12A345 and SKU 12B45 (i.e., stockkeeping unit numbers), $2.99 and $3.49 (i.e., prices).

Using the received transaction information, the PPS can generate a digital receipt based on the transaction information and send the interactive digital receipt to the user device or the POS terminal 506 in the form of a cell phone message, an electronic mail message, a webpage, a push notification, or a user interface within the mobile payment application as proof of purchase for the user. In one implementation, the user can interact with the digital receipt for performing various tasks, such as confirming the total amount, adjusting tip amount, entering feedback, applying promotional discount, etc.

In some embodiments, the acquirer, the issuer, and the card payment network can be a single entity. Therefore, once the payment card swipes through a card reader of the computing device 506, the device 506 sends the payment transaction data along with the data of the payment card to the single entity via the PPS. The single entity analyzes the data and authorizes the payment transaction; the authorization is then reported back to the PPS and/or the device 506. Such an implementation may be based on the type of card payment network, e.g., American Express.

In some embodiments where the payment card is a debit card and a personal identification number (PIN) number is entered by the user to authorize a fund transfer request, the card payment network may be a PIN debit network, for example, Accel-Exchange, Shazam, NYCE, PULSE, Star, Interlink, Maestro, etc. In order to protect these PIN numbers from accidental or malicious disclosure, stringent hardware-based encryption is mandated at the point-of-sale locations that accept these PIN-based Debit cards. After entry, the cardholder's PIN number is encrypted and securely stored within an Encrypted PIN Block (EPB) within the payment transaction data.

Even though the present subject matter may have been described with reference to a type of payment object, other types and network may be also be used. The numbering 1-4 is used to show one sequence of flow, however, other sequences are possible as would be clear to a person skilled in the art.

Figure 6:
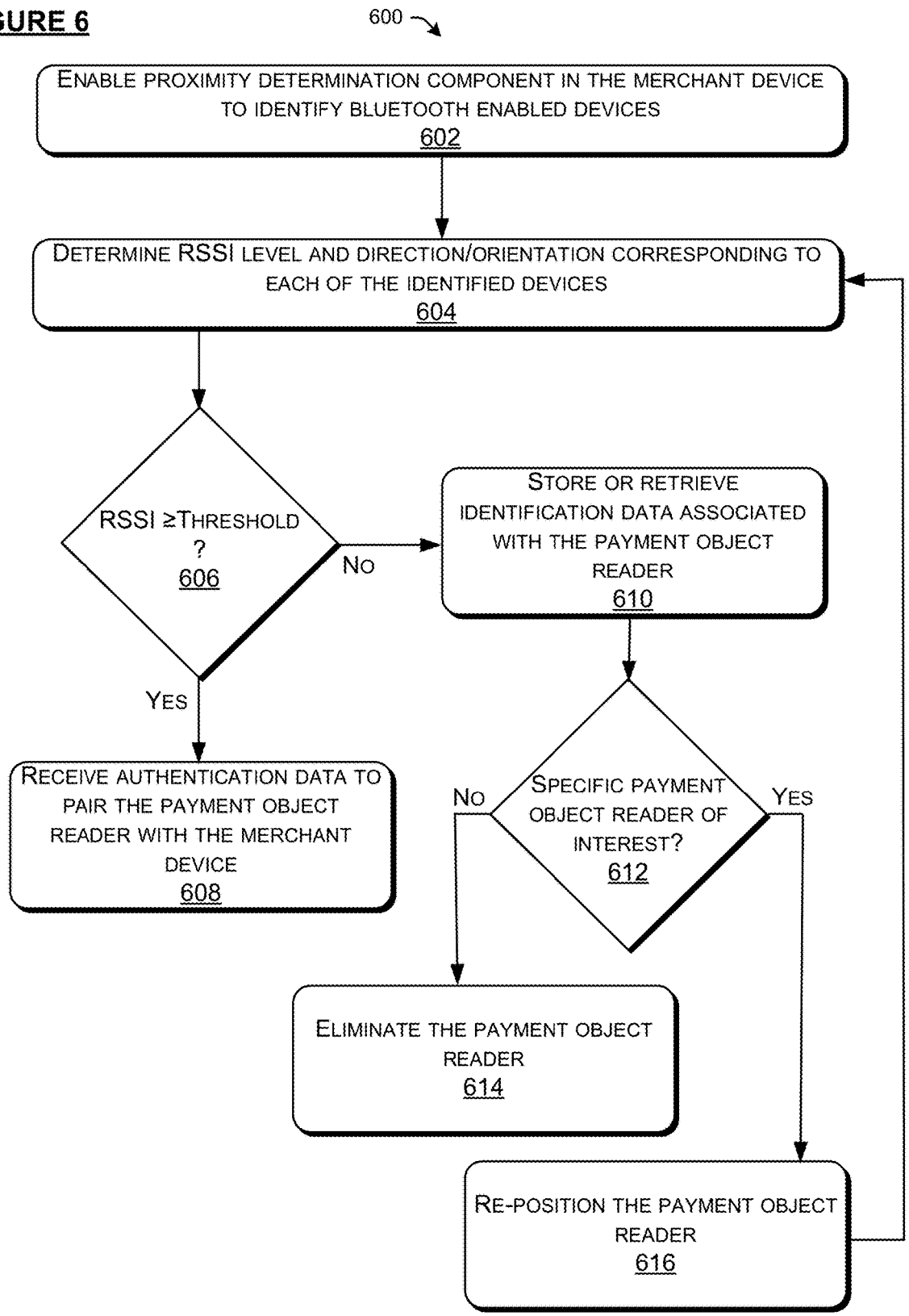
FIG. 6 is a flowchart illustrating the method of locating a desired payment object reader and then establishing the Bluetooth communication between the POS terminal and the located payment object reader, as per a signal strength-based pairing technique, according to an exemplary embodiment of the present subject matter.

FIG. 6 is a flowchart illustrating the method of locating a desired payment object reader and then performing the Bluetooth communication between a POS terminal and the located payment object reader, as per signal strength based pairing technique, according to an exemplary embodiment of the present subject matter. The figure illustrates an exemplary method for pairing a POS terminal (e.g., a mobile phone used by the merchant for processing payment transactions) with a payment object reader (e.g., a debit card reader that can accept debit cards) that is closest to the POS terminal. To initiate the process, the method includes activation of the pairing mode on the desired payment object reader so that the POS terminal can discover the reader. For this, method includes receiving from a user an input, such as a user pressing a pairing button on the payment object reader. In another example, the method may be automatically initialized without receiving an explicit instruction to pair, i.e., simply by placing the payment object reader in the magnetic or electric field of a POS terminal. In yet another implementation, the button may be absent and the method then includes detection of a payment object reader based on signal strength or RSSI levels.

To this end, the method determines distance by using the data from the proximity detection components associated with the payment object reader and the POS terminal. Additionally or alternatively, the method determines proximity based on the RSSI levels between the POS terminal and the desired payment object reader. Additionally or alternatively, the desired payment object reader can be positioned in an orientation and/or direction that changes the RSSI levels to meet or exceed the threshold RSSI levels. In one implementation, a signal strength component in the POS terminal measures the RSSI corresponding to each of the devices in the vicinity of the POS terminal. The signal strength component also includes a threshold level with which the RSSI of each device is compared, as it may be different for different devices. This will be described in detail in subsequent paragraphs.

Referring to FIG. 6, at step 602, the method includes triggering or enabling a proximity determination/location component or signal strength component within a POS terminal. The method further includes defining or retrieving a threshold value of RSSI level, and optionally, a preferred orientation/direction. For example, the preferred orientation and/or direction can be a current position between the payment object reader and the POS terminal, or can be set by a user as a user defined position between the payment object readers and the POS terminal, e.g., it can be set to be within 1 cm in any direction from the POS terminal.

At step 604, the activated proximity determination component, e.g., component, 544 can determine (a) the identity of detected payment object readers, such as the network name, proxy name, etc., and RSSI level corresponding to one or more peripheral devices, such as payment object readers, in the vicinity of the POS terminal and optionally, (b) the direction in which the payment object readers are currently positioned. Such data can be stored locally or within an external server.

At step 606, the method includes comparing RSSI data with the threshold RSSI level and/or predefined direction/orientation data, if any. If it is determined that the received RSSI levels are equal or higher than the threshold levels, the corresponding payment object reader and its identification data is obtained at step 608. However, in case of a negative determination, that is if the RSSI levels are lower than the threshold levels, the identification data from such payment object readers is stored at step 610. The method also includes determining through received merchant engagement inputs, at step 612, whether a merchant wishes to pair to a specific payment object reader selected from amongst the ones obtained at step 610. The determination test is performed for all such payment object readers obtained at step 610. If the answer is "no," for each of the identified payment object readers, the corresponding payment object readers are eliminated from any future analysis at step 614. However, if the answer is "yes," the merchant may re-position the desired payment object reader so as to be closer to the POS terminal, as shown in step 616. For example, in one implementation, the method includes randomly changing the orientation and/or direction. In another example, the positioning details can be displayed on display of the POS terminal by using an image, together with an audio or text instruction instructing change in the orientation and/or direction of the payment object reader from the reference orientation and/or direction. When the merchant positions the payment object reader in the direction that is informed to the merchant in step 616, the POS terminal senses the new position using the direction signal of the payment object reader outputted from the location component, and again receives the RSSI measured using the signal strength component at step 604. The POS terminal may store the respective orientations and/or directions in which the payment object reader is positioned, and the respective RSSIs measured in the respective orientations and/or directions, in the program data to avoid redundancies and for performance analysis.

Finally, at step 608 payment object readers having preferred orientation and/or direction and highest RSSI levels are selected to be paired with the POS terminal. In one implementation, the pairing may be automatic based on RSSI levels, while in other implementations, the pairing may be triggered only after receiving authentication data or optical authentication data from one of the users of the POS terminal and the payment object reader. In case of a plurality of payment object readers with the same RSSI levels, both payment object readers may be paired. In another example, a contention algorithm may be applied to select one from amongst the plurality of payment object readers. In some examples, a user input may be used to make the choice.

Figure 7:
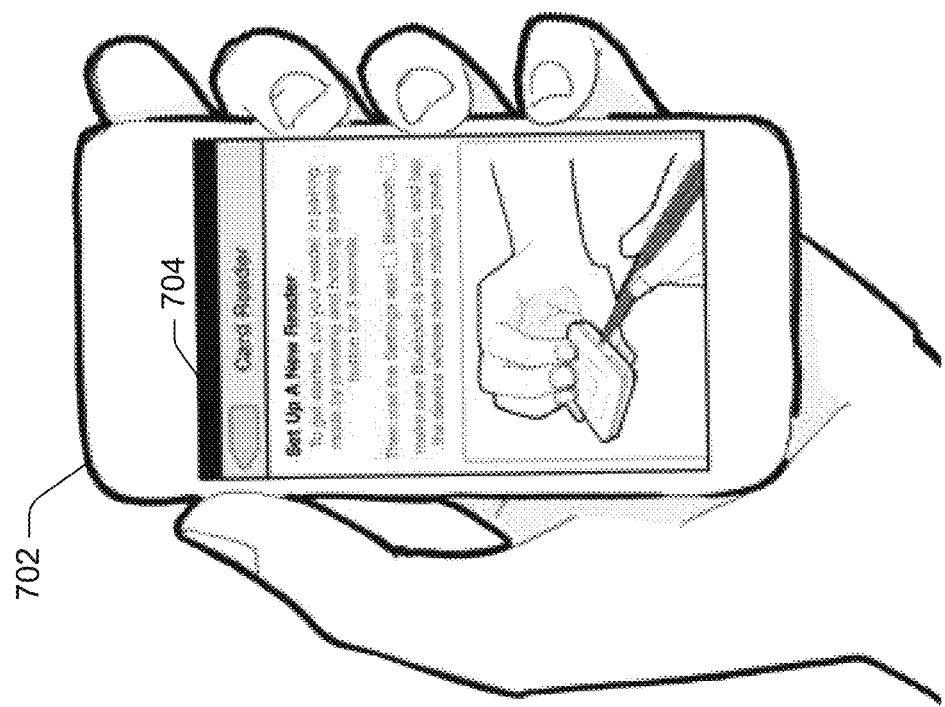
FIG. 7 illustrates an example user interface for a technique to prepare a payment card reader for pairing with the POS terminal, according to an exemplary embodiment of the present subject matter.

FIG. 7 illustrates an example user interface 704 for a technique to prepare a payment card reader for pairing with a POS terminal 702. The user interface 704 provides instructions for pairing a payment object reader using a name verification technique. In some implementations, the name verification technique involves inputting, into the computing device 702, a name or alias that is printed on the payment object reader. The computing device 702 can send the inputted name to the payment object reader. The payment object reader or an external server, e.g., payment processing system, can evaluate the name received from the computing device 702 to compare the inputted name with the name that is printed on the wireless card reader. Pairing of the computing device 702 with the payment object reader is complete if the inputted name matches the name that is printed on the payment object reader. The merchant may also enter or select an alias assigned by the user and may or may not be similar to the name printed on or associated with the payment object reader. To this end, the external server may maintain a look-up table mapping the aliases to actual names.

Figure 8:
FIG. 8 illustrates an example payment object reader shown as having a button that can be pressed and held for a specified duration of time to enable pairing mode, according to an exemplary embodiment of the present subject matter.

In some implementations, before entering the name to initiate pairing, the payment object reader is configured for pairing mode by pressing and holding a pairing button on the payment object reader for a specified duration of time (e.g., three seconds), as described in reference to FIG. 8. In such implementations, the user interface 704 provides instructions that instruct a user to pair the payment object reader by pressing and holding the pairing button on the payment object reader for a specified duration.

FIG. 8 illustrates an example payment object reader 806. In FIG. 8, a pairing button 808 on the payment object reader 806 is shown as having been pressed and held for a specified duration of time. The payment object reader 806 is configured for pairing mode when the pairing button 808 has been held for the specified duration of time. Optionally, the pairing mode is triggered in response to other kinds of inputs, such as visual, audio or haptic input. Accordingly, instead of a button, different types of interfaces may be provided. For example, the interface may include an audio sensor that responds to sound signals of a particular frequency. The interface can also be a switch that toggles between ON and OFF. A single switch may exist for both turning the device on and for turning the pairing mode on. In some cases, the payment object reader 806 may automatically turn on when placed close to a computing device, e.g., a point of sale terminal having a known configuration.

Figure 9:
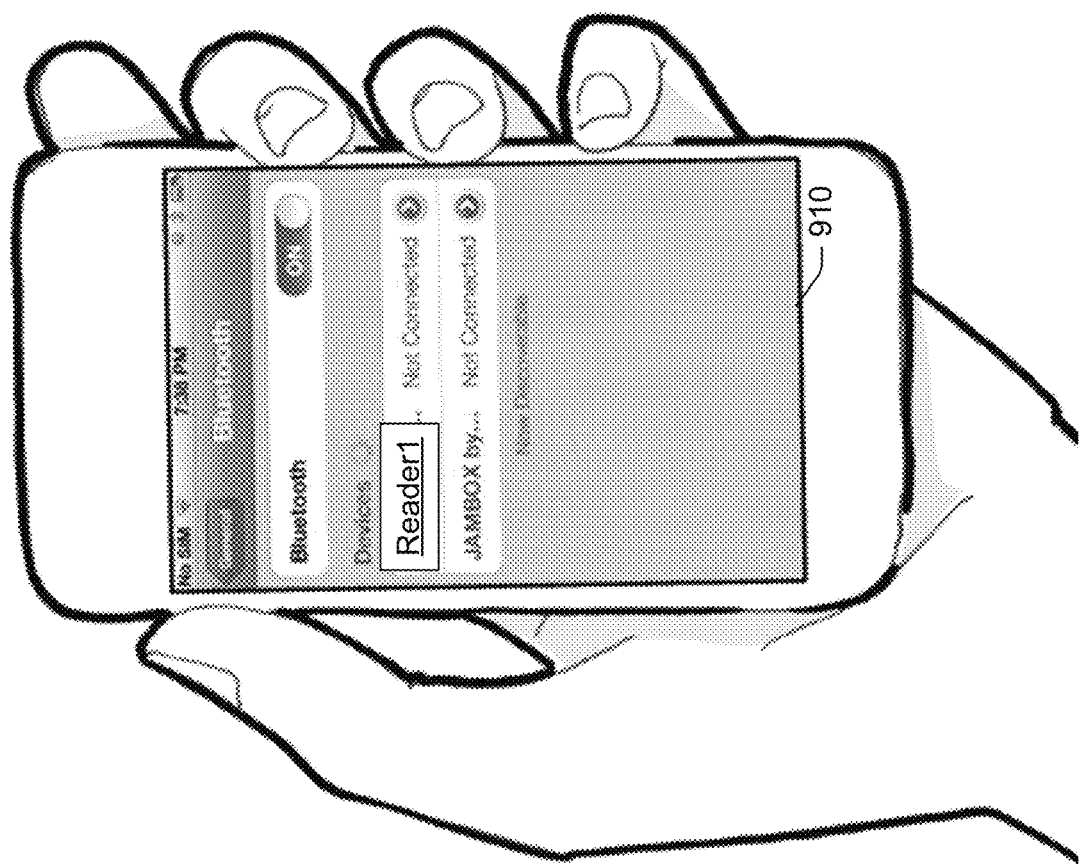
FIG. 9 illustrates an example user interface, being presented on a computing device, for pairing the POS terminal with the payment object reader, according to an exemplary embodiment of the present subject matter.

FIG. 9 illustrates an example user interface 910, being presented on the computing device 702, for pairing the computing device 702 with the payment object reader 806, as described in reference to FIG. 8.

Figure 10:
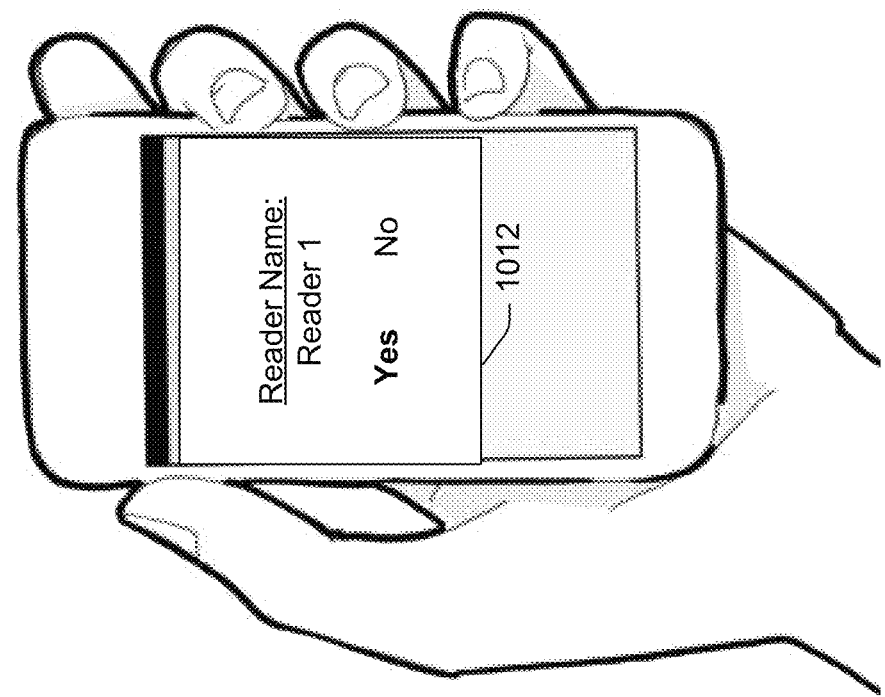
FIG. 10 illustrates an example user interface, being presented on the POS terminal, for verifying a name for the payment object reader, according to an exemplary embodiment of the present subject matter.

FIG. 10 illustrates an example user interface 1012, being presented on the computing device 702, for verifying a name for the payment object reader 806. In FIG. 10, the user interface 1012 presents the user with options 1013 for confirming whether the name 1014 displayed on the user interface 1012 matches the name for the payment object reader 806. In some implementations, the name 1014 is printed on the payment object reader 806, while in some cases, the name is an alias and the computing device 702 sends the alias selection to an external server for confirmation. The user can select one of the options 1013 to confirm whether the name 1014 displayed on the user interface 1012 matches the name that is printed on the wireless card reader. The computing device 702 can send the selected name 1014 to the wireless card reader. The payment object reader 806 (or optionally, the payment processing system) can evaluate the name 1014 received from the computing device 702 to determine whether the name 1014 matches the name printed on the wireless card reader. If the name 1014 matches the name printed on the payment object reader 806, the computing device 702 is then asked to enter public and private keys to pair with the payment object reader 806, as described in reference to FIG. 12.

Figure 11:
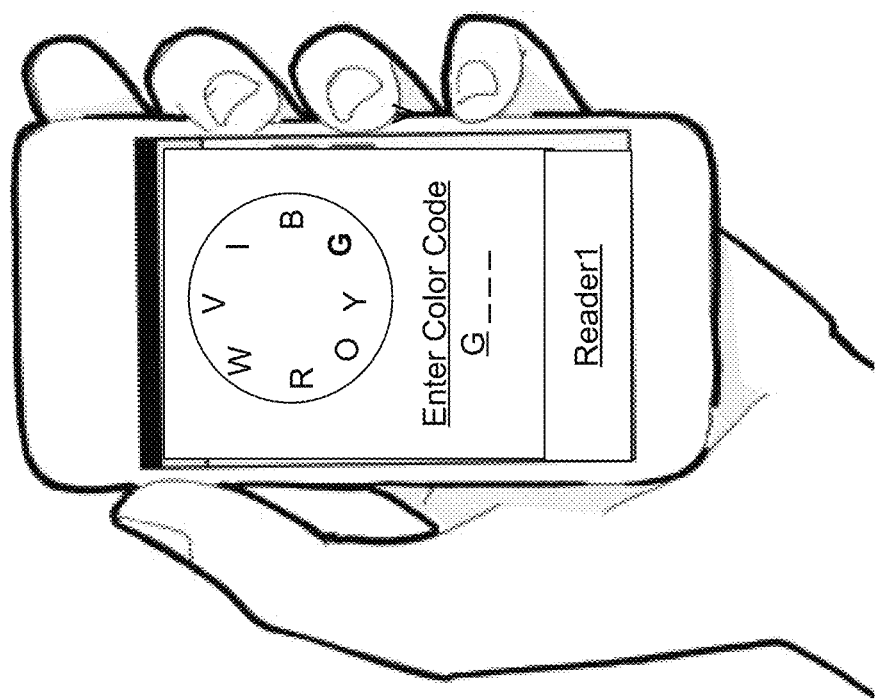
FIG. 11 illustrates an example user interface being presented on the POS terminal, according to an exemplary embodiment of the present subject matter.

FIG. 11 illustrates an example user interface 1112 being presented on the computing device 702. FIG. 11 shows a choice of colors from which the user selects colors matching the colors being displayed by the LEDs (for example, through a color mixing scheme) on the payment object reader 806. In some cases, the user interface may include a color palette or color wheel to provide more options. The user may also enter a RGB value, which the POS terminal then converts into corresponding color. The color code can be used to validate the payment object reader 806 in a user interface.

Figure 12:
FIG. 12 illustrates an example user interface, being presented on the POS terminal, for confirming a pairing of the POS terminal with the payment object reader, according to an exemplary embodiment of the present subject matter.

FIG. 12 illustrates an example user interface 1216, being presented on the computing device 702, for confirming a pairing of the computing device 702 with the payment object reader 806. In FIG. 12, the user interface 1216 presents the user with information confirming the pairing of the computing device 702 with the wireless card reader. Depending on the implementation, the information can include a graphic 1217 indicating a successful pairing, an identification number 1218 for the payment object reader 806, a connection status 1219 (e.g., "connected") of the payment object reader 806, and the remaining battery life 1220 of the payment object reader 806.

Unless contrary to physical possibility, it is envisioned that (i) the methods/steps described above may be performed in any sequence and/or in any combination, and that (ii) the components of respective embodiments may be combined in any manner. Note that any and all of the embodiments described above can be combined with each other, except to the extent that it may be stated otherwise above or to the extent that any such embodiments might be mutually exclusive in function and/or structure.

Although the present subject matter has been described with reference to specific exemplary embodiments, it will be recognized that the subject matter is not limited to the embodiments described, but can be practiced with modification and alteration within the spirit and scope of the appended claims. Accordingly, the specification and drawings are to be regarded in an illustrative sense rather than a restrictive sense. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof.

What is claimed is:

1. A payment object reader configured to facilitate a payment transaction between a merchant and a customer by accepting a payment via at least one payment object and processing the payment transaction wirelessly via a point-of-sale (POS) terminal, wherein the payment object reader comprises:
   one or more light indicators configured to display:
      (a) a first optical pattern representative of an operational status of the payment object reader in a first mode; and
      (b) a second optical pattern of an optical authentication data representative of an alphanumeric authentication data generated by a display control component of the payment object reader and associated with the payment object reader in a second mode, wherein the first optical pattern and the second optical pattern have one or more different colors, brightness, lightness, or intensities; and
   the display control component, executed by a processor, that controls the one or more light indicators of the payment object reader to operate in accordance with the first mode and the second mode, wherein the second mode comprises sharing, by the display control component of the payment object reader, the second optical pattern of the optical authentication data with the POS terminal for pairing between the payment object reader and the POS terminal.

2. The payment object reader of claim 1 further comprising a pairing component, executed by the processor, to select at least one of the first mode or the second mode based at least in part on information to be displayed.

3. The payment object reader of claim 1 further comprising a wireless transceiver configured to receive an image of the second optical pattern of the optical authentication data from a sensor associated with the POS terminal.

4. The payment object reader of claim 3 further comprising a pairing component configured to compare the image with the second optical pattern of the optical authentication data, and in response to determining that the image corresponds to the second optical pattern of the optical authentication data, sending by the wireless transceiver, a permission to the POS terminal to establish a wireless communication channel with the payment object reader for exchange of information.

5. A method for pairing a first wireless device corresponding to a payment object reader with a second wireless device, the method comprising:
receiving, by a pairing component executed by a processor of the first wireless device, a request for authentication data;
generating, by the pairing component of the first wireless device, the authentication data as a first optical representation of one or more pairing parameters associated with the first wireless device, wherein the first optical representation of the one or more pairing parameters facilitates pairing between the first wireless device and the second wireless device;
inputting, by the pairing component, the first optical representation of the one or more pairing parameters to a display control component of the first wireless device, wherein the display control component controls one or more light indicators of the first wireless device to operate in at least a first mode and a second mode, and wherein:
the one or more light indicators of the first wireless device are configured to display a second optical representation of an operational status of the first wireless device when the first mode is enabled; and
the one or more light indicators of the first wireless device are configured to display the first optical representation of the one or more pairing parameters associated with the first wireless device when the second mode is enabled, wherein the first optical representation is different from the second optical representation; and
controlling, by the display control component of the first wireless device and in response to receiving the first optical representation of the one or more pairing parameters from the pairing component, the one or more light indicators of the first wireless device to operate in the second mode for pairing the first wireless device and the second wireless device.

6. The method of claim 5 further comprising:
obtaining, by a wireless transceiver of the first wireless device, a first sensor input of the first optical representation of the one or more pairing parameters, wherein the first sensor input is transmitted to the second wireless device and input to a sensor associated with the second wireless device;
comparing, by the pairing component of the first wireless device, the first sensor input with the first optical representation of the one or more pairing parameters; and
in response to determining that the first sensor input corresponds to the first optical representation of the one or more pairing parameters, sending, from the first wireless device via the wireless transceiver and the pairing component, a permission to the second wireless device to establish a wireless communication channel between the first wireless device and the second wireless device for exchange of information.

7. The method of claim 5 further comprising controlling the one or more light indicators associated with the first wireless device to indicate a status of a payment transaction between the first wireless device and the second wireless device, wherein the second wireless device is a point-of-sale terminal.

8. The method of claim 7 further comprising:
determining whether the one or more light indicators are displaying the status of the payment transaction; and
in response to determining that the one or more light indicators are displaying the status of the payment transaction, calibrating the one or more light indicators in accordance with the first optical representation of the one or more pairing parameters.

9. The method of claim 5, wherein generating the first optical representation of the one or more pairing parameters further comprises encoding the one or more pairing parameters, and wherein encoding includes associating each of the one or more pairing parameters with a unique color, brightness, lightness, intensity, or chroma.

10. The method of claim 9, wherein generating further comprises:
determining a color code corresponding to each of the one or more pairing parameters based on a predefined color assignment;
mixing, by the pairing component, the color codes to obtain a color unique to the one or more pairing parameters; and
transmitting, through the one or more light indicators, one or more light signals corresponding to the color obtained through integration of the color codes.

11. The method of claim 5, wherein the first optical representation of the one or more pairing parameters is machine perceptible.

12. The method of claim 6, further comprising:
generating, by a signal strength component executed by the processor in the first wireless device, a signal strength value to indicate a proximity of the first wireless device with respect to the second wireless device;
transmitting, by the wireless transceiver of the first wireless device, a measure of the proximity to the second wireless device based at least on the signal strength value; and
receiving another request, from the second wireless device, for display of the first optical representation of the one or more pairing parameters based on the measure of the proximity.

13. The method of claim 6, further comprising:
generating a third optical representation of a security token, wherein the third optical representation of the security token is configured to be transmitted in one or more colors, brightness, lightness, and intensities;

transmitting, through the one or more light indicators associated with the first wireless device, the third optical representation of the security token;

obtaining, by the wireless transceiver of the first wireless device and in response to one of a user input or a second sensor input captured by the second wireless device, a second user input from the second wireless device;

comparing, by the pairing component, the second user input with the third optical representation of the security token; and in response to determining that the second user input corresponds to the third optical representation of the security token, sending, by the wireless transceiver and the pairing component, another permission to the second wireless device to convert the wireless communication channel into a secure wireless communication channel.

14. A network for establishing a wireless communication channel between a point-of-sale (POS) terminal and at least one payment object reader, the network comprising:

the payment object reader configured to initiate a payment transaction between a merchant and a customer by accepting payment through a payment object selected from a group of a radio frequency identification (RFID) payment object, a Europay-Mastercard-Visa (EMV) payment object, and a magnetic stripe payment object, wherein the payment object reader comprises:

a wireless transceiver configured to be enabled to communicate with the POS terminal based on a wireless communication protocol;

one or more light emitting diodes (LEDs) configured to emit light in one or more colors, brightness, lightness, and intensities;

a display control component, executed by a processor, configured to control the LEDs to operate in a first mode and a second mode, wherein the first mode when enabled triggers the LEDs to display a first optical pattern representative of status of the payment transaction and the second mode when enabled triggers the LEDs to display a second optical pattern of an optical authentication data representative of an alphanumeric authentication data; and a pairing component, via the processor, configured to compare incoming data from the POS terminal with the optical authentication data; and the POS terminal configured to process the payment transaction between the merchant and the customer, the POS terminal comprises:

a POS wireless transceiver configured to discover the payment object reader having its respective wireless transceivers enabled;

a sensor configured to capture an image of the second optical pattern; and a POS pairing component configured to transmit the captured image to the pairing component of the payment object reader for comparison of the captured image with the optical authentication data;

wherein the POS terminal is configured to establish the wireless communication channel with the wireless transceiver of the payment object reader in response to receiving from the pairing component confirmation of a correspondence between the optical authentication data and the captured image, and wherein the established wireless communication channel enables the POS terminal to receive data read off the payment object through the payment object reader and transfer to a payment processing system, and wherein the payment processing system processes the payment transaction by causing funds to be transferred from a financial account of the customer to a financial account of the merchant based on the data read off the payment object.

15. The network of claim 14, wherein the pairing component is configured to encode the alphanumeric authentication data in a color space to generate the optical authentication data.

16. The network of claim 14 further comprising a graphical user interface communicatively coupled to the sensor, wherein the graphical user interface is configured to receive one or more user inputs of a pattern resembling the optical authentication data.

17. The network of claim 14, wherein the POS terminal includes a signal strength component to measure a received signal strength indicator (RSSI) level corresponding to the payment object reader, wherein the wireless communication channel is established based at least in part on the RSSI level and the optical authentication data.

18. The network of claim 14, wherein the payment object reader is further configured to:

customize a security token based on the payment transaction;

generate an optical representation of the security token, wherein the optical representation is capable of being transmitted in one or more colors, brightness, and intensities;

transmit, through the LEDs associated with the payment object reader, the optical representation of the security token;

obtain, by the wireless transceiver and in response to one of a visual inspection or an image, a second user input from the POS terminal;

compare the second user input with the optical representation of the security token; and in response to determining that the second user input corresponds to the optical representation of the security token, send, by the wireless transceiver, a permission to the POS terminal to convert the established wireless communication channel as a secure wireless communication channel.

19. One or more non-transitory computer-readable media maintaining instructions that, when executed by one or more processors, program the one or more processors to:

obtain, by the one or more processors, alphanumeric authentication data capable of establishing a wireless communication channel for exchange of information between a first device corresponding to a payment object reader and a second device;

determine, by the one or more processors of the first device, an optical representation of the alphanumeric authentication data associated with the first device, wherein the alphanumeric authentication data is generated by a display control component of the first device and is configured to be transmitted by the display control component of the first device as one or more light signals, and wherein the display control component is configured to:

transmit a first optical representation of the alphanumeric authentication data associated with of an operational status of the first device when a first mode is enabled; and transmit a second optical representation associated with an operational status of the first device when a second mode is enabled, wherein the first optical representation is different from the second optical representation;

transmit, by the display control component of the first device and through one or more visual indicators of the first device, the first optical representation of the alphanumeric authentication data;

obtain, by the one or more processors of the first device and in response to one of a visual inspection or an image capture by the second device, an input from the second device;

compare, by the one or more processors of the first device, the input with the first optical representation of the alphanumeric authentication data; and in response to determining, by the first device, that the input corresponds to the first optical representation of the alphanumeric authentication data, send, by the one or more processors of the first device, a permission to the second device to establish the wireless communication channel between the first device and the second device for exchange of information.

20. The one or more non-transitory computer-readable media of claim 19, wherein the instructions further program the one or more processors to generate the first optical representation of the alphanumeric authentication data by encoding the alphanumeric authentication data in a color space.

21. The one or more non-transitory computer-readable media of claim 19, wherein the instructions further program the one or more processors to:

customize a security token based on a payment transaction;

generate the second optical representation of the security token, wherein the second optical representation of the security token is capable of being transmitted in one or more colors, brightness, and intensities;

transmit, through the one or more visual indicators of the first device, the second optical representation of the security token;

obtain, by a wireless transceiver of the first device and in response to one of the visual inspection or the image capture by the second device, a second input from the second device;

compare, by a pairing component of the first device, the second input with the second optical representation of the security token; and in response to determining that the second input corresponds to the second optical representation of the security token, send, by a Bluetooth transceiver, a permission to the second device to establish the wireless communication channel as a secure wireless communication channel.

* * * * *